United States Patent
Takeda et al.

(10) Patent No.: US 12,004,172 B2
(45) Date of Patent: Jun. 4, 2024

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP); Lihui Wang, Beijing (CN); Shaozhen Guo, Beijing (CN)

(73) Assignee: NTT DOCOMO, INC., Tokyo (JP)

(*) Notice: Subject to any disclaimer, the term of this patent is extended or adjusted under 35 U.S.C. 154(b) by 461 days.

(21) Appl. No.: 17/295,954

(22) PCT Filed: Nov. 22, 2018

(86) PCT No.: PCT/JP2018/043235
§ 371 (c)(1),
(2) Date: May 21, 2021

(87) PCT Pub. No.: WO2020/105180
PCT Pub. Date: May 28, 2020

(65) Prior Publication Data
US 2022/0007405 A1    Jan. 6, 2022

(51) Int. Cl.
*H04W 72/23* (2023.01)
*H04L 5/14* (2006.01)
*H04W 72/0446* (2023.01)
*H04W 72/1263* (2023.01)

(52) U.S. Cl.
CPC ............... *H04W 72/23* (2023.01); *H04L 5/14* (2013.01); *H04W 72/0446* (2013.01); *H04W 72/1263* (2013.01)

(58) Field of Classification Search
CPC ............. H04W 72/23; H04W 72/0446; H04W 72/1263; H04W 28/18; H04W 8/24; H04L 5/14; H04L 5/1469
See application file for complete search history.

(56) References Cited

U.S. PATENT DOCUMENTS

2019/0342898 A1* 11/2019 Nam ................. H04W 72/0446

FOREIGN PATENT DOCUMENTS

EP    3160206 A1 *  4/2017  ............ H04W 24/10

OTHER PUBLICATIONS

Office Action issued in the counterpart Chinese Patent Application No. 201880100628.5, dated Jun. 29, 2023 (14 pages).
(Continued)

*Primary Examiner* — Thai Nguyen
(74) *Attorney, Agent, or Firm* — Osha Bergman Watanabe & Burton LLP

(57) ABSTRACT

To appropriately control half-duplex communication in a future radio communication system, one aspect of a user terminal according to the present disclosure includes: a reception section that receives slot format information that indicates a slot format of a cell; and a control section, when transmission and reception in transmission directions are instructed, performs control to perform transmission and reception in a given cell and to not perform transmission and reception in another cell based on a method for instructing transmission and reception in each cell, the transmission directions being different between a plurality of cells for which slot formats are configured to flexible.

6 Claims, 9 Drawing Sheets

(56) References Cited

OTHER PUBLICATIONS

Qualcomm Incorporated.; "Summary of GC-PDCCH carrying SFI"; 3GPP TSG RAN WG1 #94bis, R1-1811907; Chengdu, China; Oct. 8-12, 2018 (4 pages).
Extended European Search Report issued in counterpart European Patent Application No. 18940614.3, dated Jun. 1, 2022 (7 pages).
NTT Docomo, Inc.; "Maintenance for Physical downlink control channel"; 3GPP TSG RAN WG1 Meeting #94bis, R1-1811373; Chengdu, China; Oct. 8-12, 2018 (18 pages).
Office Action issued in counterpart Japanese Patent Application No. 2020-557107 dated Jan. 31, 2023 (8 pages).
International Search Report issued in PCT/JP2018/043235 dated Jan. 22, 2019 (2 pages).
Written Opinion of the International Searching Authority issued in PCT/JP2018/043235 dated Jan. 22, 2019 (4 pages).
Qualcomm Incorporated; "Summary of GC-PDCCH carrying SFI"; 3GPP TSG RAN WG1 #95, R1-1814030; Spokane, USA; Nov. 12-16, 2018 (3 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

\* cited by examiner

| Format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |
| 27 | D | D | D | F | F | F | F | F | F | F | F | U | U | U |
| 28 | D | D | D | D | D | D | D | D | D | D | D | D | F | U |
| 29 | D | D | D | D | D | D | D | D | D | D | D | F | F | U |
| 30 | D | D | D | D | D | D | D | D | D | D | F | F | F | U |
| 31 | D | D | D | D | D | D | D | D | D | D | D | F | U | U |
| 32 | D | D | D | D | D | D | D | D | D | D | F | F | U | U |
| 33 | D | D | D | D | D | D | D | D | D | F | F | F | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | D | F | F | F | F | U |
| 44 | D | D | D | D | D | D | F | F | F | F | F | F | U | U |
| 45 | D | D | D | D | D | D | F | F | U | U | U | U | U | U |
| 46 | D | D | D | D | F | D | D | D | D | D | D | D | F | U |
| 47 | D | D | F | U | U | U | U | U | U | F | U | U | U | U |
| 48 | D | F | U | U | U | U | U | U | F | U | U | U | U | U |
| 49 | D | D | D | D | F | F | U | U | D | D | D | D | F | F |
| 50 | D | D | F | F | U | U | U | D | D | F | F | U | U | U |
| 51 | D | F | F | U | U | U | U | D | F | F | U | U | U | U |
| 52 | D | F | F | F | F | F | U | D | F | F | F | F | F | U |
| 53 | D | D | F | F | F | F | U | D | D | F | F | F | F | U |
| 54 | F | F | F | F | F | F | F | D | D | D | D | D | D | D |
| 55 | D | D | F | F | F | U | U | U | D | D | D | D | D | D |
| 56 – 254 | Reserved | | | | | | | | | | | | | |
| 255 | UE determines the slot format for the slot based on *TDD-UL-DL-ConfigurationCommon*, or *TDD-UL-DL-ConfigDedicated* and, if any, on detected DCI formats | | | | | | | | | | | | | |

FIG. 1

| CASE | NON-CA CASE | | UE OPERATION |
|---|---|---|---|
| 1 | DL (TDD CONFIGURATION) | UL GRANT/SEMI-STATIC UL/SFI UL | ERROR |
| 2 | UL (TDD CONFIGURATION) | DL ASSIGNMENT/SEMI-STATIC DL/SFI DL | ERROR |
| 3 | Flexible (TDD CONFIGURATION) | | ERROR |
| | DL ASSIGNMENT/SFI DL | UL GRANT/SFI UL | |
| 4 | Flexible (TDD CONFIGURATION) | | WHEN TIMELINE IS SUFFICIENT, DL ASSIGNMENT CANCELS SEMI-STATIC UL |
| | DL ASSIGNMENT/SFI DL | SEMI-STATIC UL | |
| 5 | Flexible (TDD CONFIGURATION) | | UL GRANT CANCELS SEMI-STATIC DL |
| | SEMI-STATIC DL | UL GRANT/SFI UL | |
| 6 | Flexible (TDD CONFIGURATION) | | ERROR |
| | SEMI-STATIC DL | SEMI-STATIC UL | |
| 7 | Flexible (DYNAMIC SFI) | | ERROR |
| | DL ASSIGNMENT | UL GRANT | |
| 8 | Flexible (DYNAMIC SFI) | | WHEN TIMELINE IS SUFFICIENT, DL ASSIGNMENT CANCELS SEMI-STATIC UL |
| | DL ASSIGNMENT | SEMI-STATIC UL | |
| 9 | Flexible (DYNAMIC SFI) | | UL GRANT CANCELS SEMI-STATIC DL |
| | SEMI-STATIC DL | UL GRANT | |
| 10 | Flexible (DYNAMIC SFI) | | ERROR |
| | SEMI-STATIC DL | SEMI-STATIC UL | |

FIG. 2

| CASE | CC1 | CC2 | UE OPERATION |
|---|---|---|---|
| 1 | DL (TDD CONFIGURATION) | UL GRANT/SEMI-STATIC UL/SFI UL | ERROR |
| 2 | UL (TDD CONFIGURATION) | DL ASSIGNMENT/SEMI-STATIC DL/SFI DL | ERROR |
| 3 | Flexible (TDD CONFIGURATION) / DL ASSIGNMENT/SFI DL | UL GRANT/SFI UL | ERROR |
| 4 | Flexible (TDD CONFIGURATION) / DL ASSIGNMENT/SFI DL | SEMI-STATIC UL | ERROR |
| 5 | Flexible (TDD CONFIGURATION) / SEMI-STATIC DL | UL GRANT/SFI UL | ERROR |
| 6 | Flexible (TDD CONFIGURATION) / SEMI-STATIC DL | SEMI-STATIC UL | ERROR |
| 7 | Flexible (TDD CONFIGURATION) / UL GRANT/SFI UL | DL ASSIGNMENT/SFI DL | ERROR |
| 8 | Flexible (TDD CONFIGURATION) / UL GRANT/SFI UL | SEMI-STATIC DL | ERROR |
| 9 | Flexible (TDD CONFIGURATION) / SEMI-STATIC UL | DL ASSIGNMENT/SFI DL | ERROR |
| 10 | Flexible (TDD CONFIGURATION) / SEMI-STATIC UL | SEMI-STATIC DL | ERROR |
| 11 | Flexible (DYNAMIC SFI) / DL ASSIGNMENT | UL GRANT/SFI UL | ERROR |
| 12 | Flexible (DYNAMIC SFI) / DL ASSIGNMENT | SEMI-STATIC UL | ERROR |
| 13 | Flexible (DYNAMIC SFI) / SEMI-STATIC DL | UL GRANT/SFI UL | ERROR |
| 14 | Flexible (DYNAMIC SFI) / SEMI-STATIC DL | SEMI-STATIC UL | ERROR |
| 15 | Flexible (DYNAMIC SFI) / UL GRANT | DL ASSIGNMENT/SFI DL | ERROR |
| 16 | Flexible (DYNAMIC SFI) / UL GRANT | SEMI-STATIC DL | ERROR |
| 17 | Flexible (DYNAMIC SFI) / SEMI-STATIC UL | DL ASSIGNMENT/SFI DL | ERROR |
| 18 | Flexible (DYNAMIC SFI) / SEMI-STATIC UL | SEMI-STATIC DL | ERROR |

FIG. 3

| CASE | CC1 | CC2 | UE OPERATION |
|---|---|---|---|
| 1 | DL (TDD CONFIGURATION) | UL GRANT/SEMI-STATIC UL/SFI UL | ERROR |
| 2 | UL (TDD CONFIGURATION) | DL ASSIGNMENT/SEMI-STATIC DL/SFI DL | ERROR |
| 3 | Flexible (TDD CONFIGURATION) / DL ASSIGNMENT/SFI DL | UL GRANT/SFI UL | ERROR |
| 4 | Flexible (TDD CONFIGURATION) / DL ASSIGNMENT/SFI DL | SEMI-STATIC UL | WHEN TIMELINE IS SUFFICIENT, DL ASSIGNMENT/SFI DL OF CC 1 CANCELS SEMI-STATIC UL OF CC 2 |
| 5 | Flexible (TDD CONFIGURATION) / SEMI-STATIC DL | UL GRANT/SFI UL | ERROR |
| 6 | Flexible (TDD CONFIGURATION) / SEMI-STATIC DL | SEMI-STATIC UL | ERROR |
| 7 | Flexible (TDD CONFIGURATION) / UL GRANT/SFI UL | DL ASSIGNMENT/SFI DL | ERROR |
| 8 | Flexible (TDD CONFIGURATION) / UL GRANT/SFI UL | SEMI-STATIC DL | UL GRANT/SFI UL OF CC 1 CANCELS SEMI-STATIC DL OF CC 2 |
| 9 | Flexible (TDD CONFIGURATION) / SEMI-STATIC UL | DL ASSIGNMENT/SFI DL | ERROR |
| 10 | Flexible (TDD CONFIGURATION) / SEMI-STATIC UL | SEMI-STATIC DL | ERROR |
| 11 | Flexible (DYNAMIC SFI) / DL ASSIGNMENT | UL GRANT/SFI UL | ERROR |
| 12 | Flexible (DYNAMIC SFI) / DL ASSIGNMENT | SEMI-STATIC UL | WHEN TIMELINE IS SUFFICIENT, DL ASSIGNMENT OF CC 1 CANCELS SEMI-STATIC UL OF CC 2 |
| 13 | Flexible (DYNAMIC SFI) / SEMI-STATIC DL | UL GRANT/SFI UL | ERROR |
| 14 | Flexible (DYNAMIC SFI) / SEMI-STATIC DL | SEMI-STATIC UL | ERROR |
| 15 | Flexible (DYNAMIC SFI) / UL GRANT | DL ASSIGNMENT/SFI DL | ERROR |
| 16 | Flexible (DYNAMIC SFI) / UL GRANT | SEMI-STATIC DL | UL GRANT OF CC 1 CANCELS SEMI-STATIC DL OF CC 2 |
| 17 | Flexible (DYNAMIC SFI) / SEMI-STATIC UL | DL ASSIGNMENT/SFI DL | ERROR |
| 18 | Flexible (DYNAMIC SFI) / SEMI-STATIC UL | SEMI-STATIC DL | ERROR |

FIG. 4

| CASE | CC1 | CC2 | UE OPERATION |
|---|---|---|---|
| 1 | DL (TDD CONFIGURATION) | UL GRANT/SEMI-STATIC UL/SFI UL | ERROR |
| 2 | UL (TDD CONFIGURATION) | DL ASSIGNMENT/SEMI-STATIC DL/SFI DL | ERROR |
| 3 | Flexible (TDD CONFIGURATION) / DL ASSIGNMENT/SFI DL | UL GRANT/SFI UL | ERROR |
| 4 | Flexible (TDD CONFIGURATION) / DL ASSIGNMENT/SFI DL | SEMI-STATIC UL | WHEN TIMELINE IS SUFFICIENT, DL ASSIGNMENT/SFI DL OF CC 1 CANCELS SEMI-STATIC UL OF CC 2 |
| 5 | Flexible (TDD CONFIGURATION) / SEMI-STATIC DL | UL GRANT/SFI UL | UL GRANT/SFI UL OF CC 2 CANCELS SEMI-STATIC DL OF CC 1 |
| 6 | Flexible (TDD CONFIGURATION) / SEMI-STATIC DL | SEMI-STATIC UL | ERROR |
| 7 | Flexible (TDD CONFIGURATION) / UL GRANT/SFI UL | DL ASSIGNMENT/SFI DL | ERROR |
| 8 | Flexible (TDD CONFIGURATION) / UL GRANT/SFI UL | SEMI-STATIC DL | UL GRANT/SFI UL OF CC 1 CANCELS SEMI-STATIC DL OF CC 2 |
| 9 | Flexible (TDD CONFIGURATION) / SEMI-STATIC UL | DL ASSIGNMENT/SFI DL | WHEN TIMELINE IS SUFFICIENT, DL ASSIGNMENT/SFI DL OF CC 2 CANCELS SEMI-STATIC UL OF CC 1 |
| 10 | Flexible (TDD CONFIGURATION) / SEMI-STATIC UL | SEMI-STATIC DL | ERROR |
| 11 | Flexible (DYNAMIC SFI) / DL ASSIGNMENT | UL GRANT/SFI UL | ERROR |
| 12 | Flexible (DYNAMIC SFI) / DL ASSIGNMENT | SEMI-STATIC UL | WHEN TIMELINE IS SUFFICIENT, DL ASSIGNMENT OF CC 1 CANCELS SEMI-STATIC UL OF CC 2 |
| 13 | Flexible (DYNAMIC SFI) / SEMI-STATIC DL | UL GRANT/SFI UL | UL GRANT/SFI UL OF CC 2 CANCELS SEMI-STATIC DL OF CC 1 |
| 14 | Flexible (DYNAMIC SFI) / SEMI-STATIC DL | SEMI-STATIC UL | ERROR |
| 15 | Flexible (DYNAMIC SFI) / UL GRANT | DL ASSIGNMENT/SFI DL | ERROR |
| 16 | Flexible (DYNAMIC SFI) / UL GRANT | SEMI-STATIC DL | UL GRANT OF CC 1 CANCELS SEMI-STATIC DL OF CC 2 |
| 17 | Flexible (DYNAMIC SFI) / SEMI-STATIC UL | DL ASSIGNMENT/SFI DL | WHEN TIMELINE IS SUFFICIENT, DL ASSIGNMENT/SFI DL OF CC 2 CANCELS SEMI-STATIC UL OF CC 1 |
| 18 | Flexible (DYNAMIC SFI) / SEMI-STATIC UL | SEMI-STATIC DL | ERROR |

FIG. 5

USER TERMINAL AND RADIO COMMUNICATION METHOD

TECHNICAL FIELD

The present disclosure relates to a user terminal and a radio communication method of a next-generation mobile communication system.

BACKGROUND ART

In Universal Mobile Telecommunications System (UMTS) networks, for the purpose of higher data rates and lower latency, Long Term Evolution (LTE) has been specified (Non-Patent Literature 1). Furthermore, for the purpose of a larger capacity and higher sophistication than those of LTE (Third Generation Partnership Project (3GPP) Release (Rel.) 8 and 9), LTE-Advanced (3GPP Rel. 10 to 14) has been specified.

LTE successor systems (also referred to as, for example, the 5th generation mobile communication system (5G), 5G+(plus), New Radio (NR) or 3GPP Rel. 15 or subsequent releases) are also studied.

Legacy LTE systems (e.g., LTE Rel. 10 and subsequent releases) have introduced Carrier Aggregation (CA) that aggregates a plurality of carriers (Component Carriers (CCs)) to obtain a wider band. Each carrier is composed by a system band of LTE Rel. 8 as one unit. Furthermore, according to CA, a plurality of CCs of an identical radio base station (eNB: eNodeB) are configured to a user terminal (UE: User Equipment).

Legacy LTE systems (e.g., LTE Rel. 12 and subsequent releases) have introduced Dual Connectivity (DC), too, that configures a plurality of Cell Groups (CGs) of different radio base stations to user terminals. Each cell group includes at least one carrier (a CC or a cell). A plurality of carriers of the different radio base stations are aggregated, and therefore DC is also referred to as inter-eNB CA.

The legacy LTE systems (e.g., LTE Rel. 14 and prior releases) have introduced Time Division Duplex (TDD) for temporally switching and performing Downlink (DL) transmission and Uplink (UL) transmission, and Frequency Division Duplex (FDD) for performing downlink transmission and uplink transmission in different frequency ranges.

According to TDD, DL communication and UL communication are temporally switched in an identical frequency range, and therefore TDD is a half-duplex communication scheme that can only perform one of transmission and reception in a certain time zone. According to FDD, DL communication and UL communication are performed in different frequency ranges, and therefore FDD is the half-duplex communication scheme and, in addition, a full-duplex communication scheme that can simultaneously perform transmission and reception in a certain time zone depending on capability of a user terminal.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April 2010

SUMMARY OF INVENTION

Technical Problem

While TDD of the legacy LTE systems is configured to switch UL and DL in a subframe unit, a future radio communication system (also referred to as NR) supports a configuration, too, that switches UL and DL in a symbol unit. In this case, how to control half-duplex communication matters.

It is therefore one of objects of the present disclosure to provide a user terminal and a radio communication method that can appropriately control half-duplex communication in a future radio communication system.

Solution to Problem

A user terminal according to one aspect of the present disclosure includes: a reception section that receives slot format information that indicates a slot format of a cell; and a control section, when transmission and reception in transmission directions are instructed, performs control to perform transmission and reception in a given cell and to not perform transmission and reception in another cell based on a method for instructing transmission and reception in each cell, the transmission directions being different between a plurality of cells for which slot formats are configured to flexible.

Advantageous Effects of Invention

According to one aspect of the present disclosure, it is possible to appropriately control half-duplex communication in a future radio communication system.

BRIEF DESCRIPTION OF DRAWINGS

FIG. 1 is a diagram illustrating one example of a table used to give notification of information related to a slot format from a base station to a UE by using DCI.

FIG. 2 is a diagram illustrating one example of transmission/reception control in a case where flexible is configured to a single cell.

FIG. 3 is a diagram illustrating one example of transmission/reception control in a case where flexible is configured to a plurality of cells.

FIG. 4 is a diagram illustrating another example of transmission/reception control in a case where flexible is configured to a plurality of cells.

FIG. 5 is a diagram illustrating another example of transmission/reception control in a case where flexible is configured to a plurality of cells.

DESCRIPTION OF EMBODIMENTS

Figure 6:
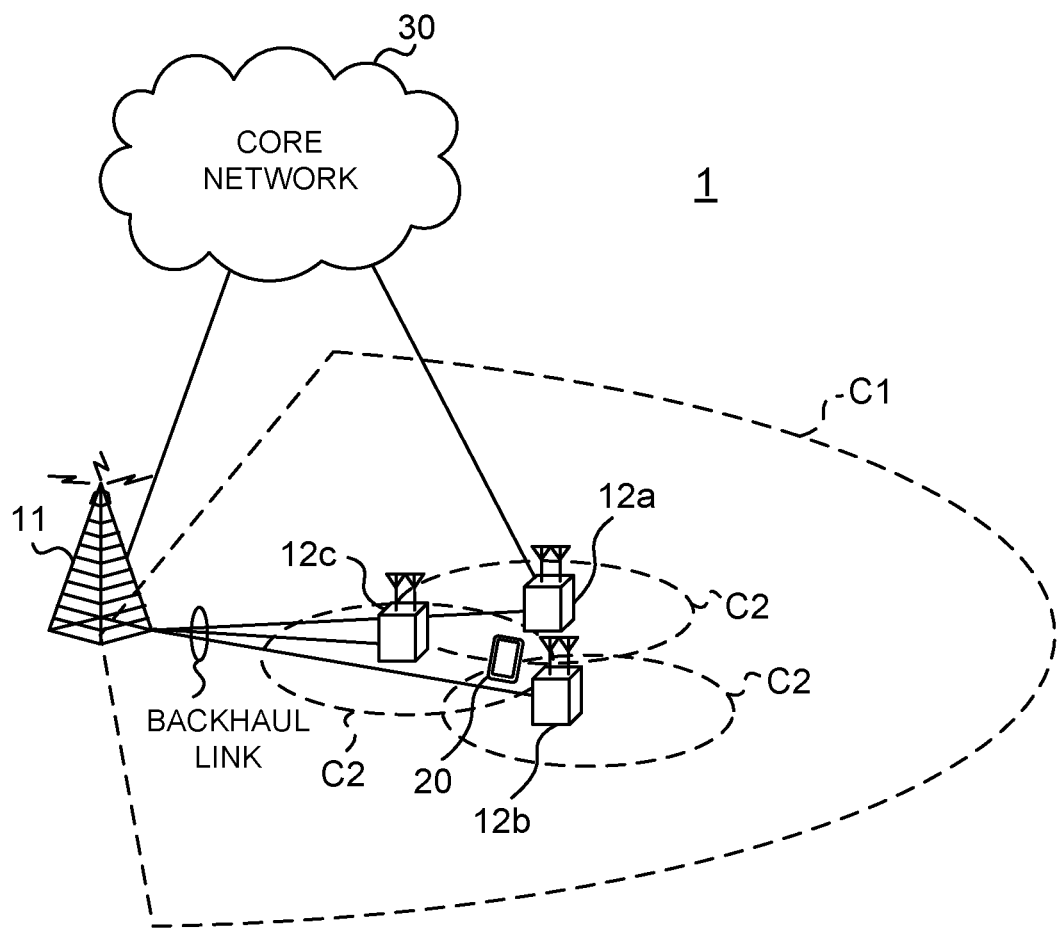
FIG. 6 is a diagram illustrating one example of a schematic configuration of a radio communication system according to one embodiment.

According to legacy LTE systems (e.g., Rel. 14 and prior releases), for example, FDD (also referred to as a frame configuration type 1) and TDD (also referred to as a frame configuration type 2) are specified as UL transmission and DL transmission configurations.

According to the frame configuration type 1 (FDD), it is possible to perform DL transmission of 10 subframes and UL transmission of 10 subframes in, for example, a radio frame (a time interval of 10 ms). Each of DL transmission and UL transmission of the 10 subframes is executed by separating respective frequency domains.

When full-duplex communication is applied to FDD, a UE can simultaneously perform UL transmission and DL reception. On the other hand, when half-duplex communication is applied to FDD (when, for example, full-duplex communication is not supported), the UE cannot simultaneously transmit/receive a DL signal and a UL signal.

According to the frame configuration type 2 (TDD), UL transmission and DL reception are switched and performed in the same frequency domain, and a Gap (GP) period is configured when DL and UL are switched. When communication is performed by using a plurality of cells during TDD (when, for example, carrier aggregation is used), the UE assumes that guard periods of special subframes between cells overlap only for a given duration.

Furthermore, when different UL/DL configurations are applied to a plurality of cells that apply CA, and the UE does not have capability for performing simultaneous reception and transmission from and to a plurality of these cells, the UE performs following operations in subframes of the different UL/DL configurations.

When a subframe of a primary cell is a DL subframe (a subframe of a secondary cell is a UL subframe), the UE does not transmit a signal or a channel in the secondary cell.

When a subframe of a primary cell is a UL subframe (a subframe of a secondary cell is a DL subframe), the UE does not assume that the UE receives a DL signal in the secondary cell.

When a subframe of a primary cell is a special subframe, and a subframe of a secondary cell is a DL subframe, the UE does not assume that the UE receives a given channel and signal in the secondary cell, and does not assume that the UE receives other channels and signals in OFDM symbols of the secondary cell that overlap a guard period or an Uplink Pilot Time Slot (UpPTS) of the primary cell, either.

In this regard, the given channel and signal may be at least one of a Physical Downlink Shared Channel (PDSCH), an Enhanced Physical Downlink Control Channel (EPDCCH), a Physical Multicast Channel (PMCH) and a Positioning Reference Signal (PRS). Furthermore, the other channels and signals may be, for example, broadcast signals or paging channels.

Furthermore, NR supports a configuration that changes a slot format in a symbol unit that makes up a subframe instead of in a subframe unit like legacy LTE, and switches and controls UL and DL.

For example, a base station transmits information related to a slot format to the UE. The UE decides a transmission direction of each symbol in a slot based on the information transmitted from the base station and related to the slot format, and controls transmission/reception. The information related to the slot format may be notified from the base station to the UE by using a higher layer signaling (e.g., at least one of tdd-UL-DL-ConfigurationCommon, tdd-UL-DL-configurationCommon2 and tdd-UL-DL-ConfigDedicated). Alternatively, the information related to the slot format may be notified from the base station to the UE by using downlink control information (e.g., Slot Format Identifier (SFI)). The DCI used to give notification of the information related to the slot format (slot format information) may be a DCI format 2_0.

The information related to the slot format may include "U" that indicates UL transmission, "D" that indicates DL transmission, and "F" (or "X") that indicates flexible that indicates neither one of UL transmission and DL transmission. FIG. 1 illustrates one example of a table used to given notification of information related to a slot format (also referred to as SFI) from the base station to the UE by using DCI. The UE may decide the slot format based on bit information included in the DCI transmitted from the base station and the table in FIG. 1.

According to NR, it is also supposed that, when carrier aggregation (e.g., TDD CA) is applied, each slot format is separately configured to each cell (that is alternatively referred to as a CC, a carrier or a band). For example, a case is also supposed where the UE that performs half-duplex communication (e.g., the UE that does not support full-duplex communication) performs communication by using a plurality of cells (e.g., CA).

In this case, it is also supposed that each slot format is separately configured to each cell. For example, a case may also occur where, when information related to respective slot formats of a plurality of given cells is transmitted from the base station, different slot format information associated with each cell is notified.

How to control a UE operation (e.g., transmission/reception) in a duration in which a different slot format is configured to each cell matters. Furthermore, when a slot format (e.g., TDD config configured by a higher layer) of each cell is each configured to Flexible (F) in a given duration, how to control the UE operation (e.g., transmission/reception) in each cell matters.

Hence, the inventors of the present disclosure have focused upon that transmission/reception are instructed even when a slot format is configured to flexible, and conceived controlling transmission/reception in each cell based on at least one of a method (e.g., a signal type used for an instruction) for instructing a slot format, and a method (e.g., a signal type used for an instruction) for instructing a transmission direction (e.g., transmission or reception) of each cell. Alternatively, the inventors of the present disclosure have conceived controlling transmission/reception in each cell irrespectively of the method for instructing the slot format and the method for instructing transmission/reception in each cell.

An embodiment according to the present disclosure will be described in detail below with reference to the drawings. UE operations 1 to 3 described below may be each applied alone or may be applied in combination. In the following description, information related to a slot format may be transmitted from the base station to the UE by using at least one of a higher layer signaling (e.g., at least one of tdd-UL-DL-ConfigurationCommon, tdd-UL-DL-configurationCommon2 and tdd-UL-DL-ConfigDedicated) and downlink control information (e.g., SFI).

In addition, the following description is suitably applicable to the UE that performs half-duplex communication (or the UE that does not support full-duplex communication), yet is not limited to this. Furthermore, the UE that performs half-duplex communication may be read as the UE that does not support full-duplex communication, the UE that does not simultaneously support DL reception and UL transmission during inter band CA, or the UE that does not simultaneously support reception and transmission for a CA band combination including SUL. Furthermore, the UE that does not support full-duplex communication may be read as the UE that does not report that the UE supports full-duplex communication.

One example of a case where a half-duplex operation is applied between a plurality of cells will be described below. In the following description, a CC 1 and a CC 2 correspond to cells in which UEs do not support full duplex (or do not report full-duplex capability). In addition, the number of cells that can be applied in the present embodiment is not limited to two, and three or more cells may be also applied likewise.

Furthermore, in the following description, UL transmission whose transmission is instructed by Downlink Control Information (DCI) may be transmission of an SRS, a PUSCH, a PUCCH or a PRACH. Furthermore, UL transmission may be scheduled by a DCI format 0_0, a DCI format 0_1, a DCI format 1_0, a DCI format 1_1, a DCI format 2_3 or a UL grant for a random access response.

DL reception whose transmission is instructed by DCI may be reception of a PDSCH or a CSI-RS. Furthermore, DL reception may be scheduled by the DCI format 1_0, the DCI format 1_1 or the DCI format 0_1.

DL (e.g., PDSCH) that is configured by a higher layer signaling (or semi-statically) may be DL (DL SPS) that corresponds to Semi-Persistent Scheduling (SPS). UL (e.g., PUSCH) that is configured by a higher layer signaling (or semi-statically) may be UL (UL SPS) that corresponds to Semi-Persistent Scheduling (SPS) or may be configured grant-based UL (e.g., configured grant-based PUSCH).

First, one example of a UE operation in a case where the UE performs a half-duplex operation by using one cell (single cell) (Non-CA) will be described.

(Single Cell)

FIG. 2 is a diagram illustrating the one example of the UE operation in the case where the single cell is used. More specifically, FIG. 2 illustrates the UE operation (cases 1 to 10) in a case where at least ones of transmission/reception whose transmission directions are different are configured in a given duration (e.g., a given slot or a given symbol duration). Transmission/reception whose transmission directions are different may be UL transmission and DL transmission, UL transmission and a dynamic DL slot format, or DL transmission and a dynamic UL slot format. The dynamic DL slot format or the UL slot format may be a slot format notified by DCI.

The case 1 is a case where a slot format (or TDD config) is configured to DL by a higher layer signaling. The UE may decide as an error case a case where UL transmission is instructed in a duration in which this DL is configured. That is, the UE may expect that UL transmission is not instructed in the duration in which this DL is configured. Alternatively, when UL transmission is instructed in the duration in which this DL is configured, the UE may ignore (or discard) a UL transmission instruction. The UL transmission instruction may be at least one of, for example, scheduling that uses a UL grant, UL transmission (e.g., UL SPS or configured grant-based UL transmission) that is configured semi-statically, and a dynamic UL slot format instruction that is given by downlink control information.

The case 2 is a case where a slot format (or TDD config) is configured to UL by a higher layer signaling. The UE may decide as an error case a case where DL transmission is instructed in a duration in which this UL is configured. That is, the UE may expect that DL transmission is not instructed in the duration in which this UL is configured. Alternatively, when DL transmission is instructed in the duration in which this UL is configured, the UE may ignore (or discard) a DL transmission instruction. The DL transmission instruction may be at least one of, for example, scheduling that uses a DL assignment, DL transmission (e.g., DL SPS) that is configured semi-statically, and a dynamic DL slot format instruction that is given by downlink control information.

The cases 3 to 6 are cases where slot formats (or TDD config) are configured to Flexible (F) by a higher layer signaling. A case also occurs where a UL transmission instruction and a DL reception instruction are notified to the UE in a duration in which Flexible (F) is configured. In this case, in a duration in which different transmission directions are configured in an overlapping manner, the UE operation may be controlled based on a method (e.g., signal type) for instructing at least one of transmission and reception (also referred to as transmission/reception below), and a method (e.g., signal type) for instructing a slot format.

When, for example, transmission directions of transmission/reception or a slot format instructed by DCI, and transmission/reception instructed by a higher layer signaling (or semi-statically) are different, the UE may prioritize one of the signal types (e.g., DCI).

In the case 3, both of a DL transmission instruction (e.g., at least one of a DL assignment and a DL slot format instruction) for a given duration, and a UL transmission instruction (e.g., a UL grant and a UL slot format instruction) are instructed by DCI. The UE may decide this case as an error case. That is, the UE may expect that both of the DL transmission instruction (e.g., at least one of the DL assignment and the DL slot format instruction) for the given duration, and the UL transmission instruction (e.g., the UL grant and the UL slot format instruction) are not instructed by the DCI. When both of the DL transmission instruction and the UL transmission instruction are instructed by the DCI, the UE may prioritize the DL transmission instruction, and ignore (or discard) the UL transmission instruction. Alternatively, the UE may prioritize the UL transmission instruction, and ignore (or discard) the DL transmission instruction. Alternatively, the UE may ignore (or discard) both of the DL transmission instruction and the UL transmission instruction, and may not perform any operation. The UE may discard a UL transmission operation (e.g., HARQ-ACK feedback) accompanying DL reception of a DL transmission instruction together when discarding the DL transmission instruction, and a DL reception operation (e.g., aperiodic CSI-RS reception operation) or a UL transmission operation (e.g., SRS transmission operation) accompanying UL transmission of a UL transmission instruction together when discarding the UL transmission instruction.

In the case 6, both of a DL transmission instruction (e.g., DL configuration) for a given duration, and a UL transmission instruction (e.g., UL configuration) are instructed by a higher layer signaling (or semi-statically). The UE may decide this case as an error case. That is, the UE may expect that both of the DL transmission instruction (e.g., DL configuration) for the given duration, and the UL transmission instruction (e.g., UL configuration) are not instructed by the higher layer signaling (or semi-statically).

In the case 4, a DL transmission instruction (e.g., at least one of a DL assignment and a DL slot format instruction) for a given duration is instructed by DCI, and a UL transmission instruction (e.g., UL configuration) is instructed by a higher layer signaling. In this case, the UE may perform control to perform DL reception and to not perform UL transmission. That is, UL transmission that is configured semi-statically may be canceled by a DL assignment. In this regard, the UE may be configured to cancel UL transmission when a sufficient time can be reserved (when, for example, a timeline defined in advance is sufficient) until the UL configuration is canceled. In this regard, canceling UL transmission may mean not performing UL transmission based on a configuration or an instruction. Furthermore, that the timeline defined in advance is sufficient may mean a case where a given processing time (e.g., N2 symbols) can be reserved by a start time of UL transmission that is canceled based on DCI after the DL transmission instruction is received from the DCI.

In the case 5, a UL transmission instruction (e.g., at least one of a UL grant and a UL slot format instruction) for a given duration is instructed by DCI, and a DL transmission instruction (e.g., DL configuration) is instructed by a higher layer signaling. In this case, the UE may perform control to perform UL transmission and to not perform DL reception. That is, DL reception that is configured semi-statically may be canceled by a UL grant. In this regard, the UE may be configured to cancel DL reception in this case. In this regard, canceling DL reception may mean not performing DL reception based on a configuration or an instruction.

The cases 7 to 10 are cases where slot formats (or dynamic SFIs) are configured to Flexible (F) by downlink control information (e.g., DCI for SFI notification). A case also occurs where a UL transmission instruction or a DL reception instruction is notified to the UE in a duration in which Flexible (F) is configured. In this case, the UE may control the UE operation based on a type of a control signal for instructing at least one of transmission and reception (also referred to as transmission/reception below) in a duration in which different transmission directions are configured in an overlapping manner, and a type of a control signal for instructing a slot format.

When, for example, transmission directions of transmission/reception instructed by Downlink Control Information (DCI), and transmission/reception instructed by a higher layer signaling (or semi-statically) are different, the UE may prioritize one of the signal types (e.g., DCI).

In the case 7, both of a DL transmission instruction (e.g., DL assignment) for a given duration, and a UL transmission instruction (e.g., UL grant) are instructed by DCI. The UE may decide this case as an error case. That is, the UE may expect that both of the DL transmission instruction (e.g., DL assignment) for the given duration, and the UL transmission instruction (e.g., UL grant) are not instructed by the DCI.

In the case 10, both of a DL transmission instruction (e.g., DL configuration) for a given duration, and a UL transmission instruction (e.g., UL configuration) are instructed by a higher layer signaling (or semi-statically). The UE may decide this case as an error case. That is, the UE may expect that both of the DL transmission instruction (e.g., DL configuration) for the given duration, and the UL transmission instruction (e.g., UL configuration) are not instructed by the higher layer signaling (or semi-statically).

In the case 8, a DL transmission instruction (e.g., DL assignment) for a given duration is instructed by DCI, and a UL transmission instruction (e.g., UL configuration) is instructed by a higher layer signaling. In this case, the UE may perform control to perform DL reception and to not perform UL transmission. That is, UL transmission that is configured semi-statically may be canceled by the DL assignment. In this regard, the UE may be configured to cancel UL transmission when a sufficient time can be reserved (when, for example, a given timeline is sufficient) until the UL configuration (or UL transmission) is canceled after the DL assignment is received.

In the case 9, a UL transmission instruction (e.g., UL grant) for a given duration is instructed by DCI, and a DL transmission instruction (e.g., DL configuration) is instructed by a higher layer signaling. In this case, the UE may perform control to perform UL transmission and to not perform DL reception. That is, DL reception that is configured semi-statically may be canceled by the UL grant. In this regard, the UE may be configured to cancel DL reception in this case.

(A Plurality of Cells)

When using a plurality of cells, the UE may apply a half-duplex operation between a plurality of these cells. Whether the half-duplex operation needs to be applied between a plurality of these cells or a full-duplex operation is applicable can be reported as terminal capability information (e.g., simultaneousRxTxInterBandCA) from the UE to the radio base station per, for example, band combination. In this case, when transmission/reception in transmission directions that are the same between a plurality of cells are instructed in a given duration, the UE only needs to perform instructed transmission/reception in each cell. On the other hand, when transmission/reception (or scheduling or configuration) whose transmission directions are different between a plurality of cells are instructed, the UE may apply one of the following UE operations 1 to 3.

<UE Operation 1>

FIG. 3 is a diagram illustrating one example of a UE operation in a case where a plurality of cells (the CC 1 and the CC 2 in this case) are used. More specifically, FIG. 3 illustrates the UE operation (cases 1 to 18) in a case where different transmission directions are configured to the CC 1 and the CC 2 in a given duration (e.g., a given slot or a given symbol duration). Configuring the transmission directions may be read as one of instructions of UL transmission, DL reception, a dynamic UL slot format and a dynamic DL slot format.

The case 1 is a case where a slot format (or TDD config) is configured to DL (D) for the CC 1 by a higher layer signaling. The UE may decide as an error case a case where UL transmission is instructed to the CC 2 in the duration in which this DL (D) is configured. That is, the UE may expect that UL transmission is not instructed in the duration in which this DL is configured. Alternatively, when UL transmission is instructed in the duration in which this DL is configured, the UE may ignore (or discard) a UL transmission instruction. The UL transmission instruction may be at least one of, for example, scheduling that uses a UL grant, UL transmission (e.g., UL SPS or configured grant-based UL transmission) that is configured semi-statically, and a dynamic UL slot format instruction that is given by downlink control information.

The case 2 is a case where a slot format (or TDD config) is configured to UL (U) for the CC 2 by a higher layer signaling. The UE may decide as an error case a case where DL transmission is instructed to the CC 2 in a duration in which this UL (U) is configured. That is, the UE may expect that DL transmission is not instructed in the duration in which this UL is configured. Alternatively, when DL transmission is instructed in the duration in which this UL is configured, the UE may ignore (or discard) a DL transmission instruction. The DL transmission instruction may be at least one of, for example, scheduling that uses a DL assignment, DL transmission (e.g., DL SPS) that is configured semi-statically, and a dynamic DL slot format instruction that is given by downlink control information.

The cases 3 to 18 are cases where slot formats (or TDD config) are configured to Flexible (F) for the CC 1 and the CC 2. More specifically, the cases 3 to 10 are cases where slot formats (or TDD config) are configured to Flexible (F)

for the CC 1 by a higher layer signaling. Furthermore, the cases 11 to 18 are cases where slot formats (or dynamic SFIs) are configured to Flexible (F) for the CC 1 by downlink control information (e.g., DCI for SFI notification).

The slot format may be configured to the CC 2 by the higher layer signaling (e.g., TDD config), or may be configured by the downlink control information. Alternatively, when the slot format is not configured to the CC 2 by the higher layer signaling, the UE may assume that Flexible (F) is configured to the CC 2 in a duration in which the slot format is not configured.

A case also occurs where a UL transmission instruction and a DL reception instruction are notified to the CC 1 and the CC 2 in a duration in which Flexible (F) is configured. In this case, there is also a duration in which different transmission directions are configured to the CC 1 and the CC 2 in an overlapping manner.

According to the UE operation 1, the UE decides as an error case a case where transmission/reception whose transmission directions are different are instructed to a plurality of cells (e.g., the CC 1 and the CC 2) for which the slot formats are configured to Flexible (F). The UE may perform control to perform a given operation (e.g., cancelation of transmission/reception in each cell) when deciding this case as the error case.

That is, transmission/reception instructed to the CC 1 (e.g., transmission/reception configured by the higher layer signaling) are configured to not be canceled by transmission/reception instructed to the CC 2 (e.g., transmission/reception scheduled by the DCI). Similarly, transmission/reception instructed to the CC 2 (e.g., transmission/reception configured by the higher layer signaling) are configured to not be canceled by transmission/reception instructed to the CC 1 (e.g., transmission/reception scheduled by the DCI).

In the cases 3 and 7, transmission/reception whose transmission directions are different are configured to the CC 1 and the CC 2 by downlink control information in a given duration. For example, a DL transmission instruction (e.g., at least one of a DL assignment and a DL slot format instruction), and a UL transmission instruction (e.g., at least one of a UL grant and a UL slot format instruction) are each instructed to the CC 1 and the CC 2 by DCI. The UE may decide this case as an error case.

When deciding this case as the error case, the UE may expect that both of the DL transmission instruction (e.g., at least one of the DL assignment and the DL slot format instruction) for a given duration, and the UL transmission instruction (e.g., the UL grant and the UL slot format instruction) are not instructed by the DCI. When both of the DL transmission instruction and the UL transmission instruction are instructed by the DCI, the UE may prioritize the DL transmission instruction, and ignore (or discard) the UL transmission instruction. Alternatively, the UE may prioritize the UL transmission instruction, and ignore (or discard) the DL transmission instruction. Alternatively, the UE may ignore (or discard) both of the DL transmission instruction and the UL transmission instruction, and may not perform any operation. The UE may discard a UL transmission operation (e.g., HARQ-ACK feedback) accompanying DL reception of a DL transmission instruction together when discarding the DL transmission instruction, and a DL reception operation (e.g., aperiodic CSI-RS reception operation) or a UL transmission operation (e.g., SRS transmission operation) accompanying UL transmission of a UL transmission instruction together when discarding the UL transmission instruction.

In the cases 6 and 10, transmission/reception whose transmission directions are different are configured to the CC 1 and the CC 2 by a higher layer signaling (or semi-statically) in a given duration. For example, a DL transmission instruction (e.g., DL configuration) and a UL transmission instruction (e.g., UL configuration) are each configured to the CC 1 and the CC 2 by the higher layer signaling (or semi-statically). The UE may decide this case as an error case. That is, the UE may expect that both of the DL transmission instruction (e.g., DL configuration) for the given duration and the UL transmission instruction (e.g., UL configuration) are not instructed by the higher layer signaling (or semi-statically).

In the cases 4 and 9, transmission/reception whose transmission directions are different are configured to the CC 1 and the CC 2 by downlink control information and a higher layer signaling in a given duration. For example, a DL transmission instruction (e.g., at least one of a DL assignment and a DL slot format instruction) is instructed to one of the CC 1 and the CC 2 by DCI, and a UL transmission instruction (e.g., UL configuration) is instructed to the other one of the CC 1 and the CC 2 by a higher layer signaling. The UE may decide this case as an error case.

When deciding this case as the error case, the UE may expect that the DL transmission instruction (e.g., at least one of the DL assignment and the DL slot format instruction) for a given duration is not instructed by the DCI. Furthermore, the UE may expect that the UL transmission instruction (e.g., UL configuration) for the given duration is not instructed by the higher layer signaling (or semi-statically). Furthermore, when the DL transmission instruction is given by the DCI and the UL transmission instruction is given by the higher layer signaling, the UE may prioritize the DL transmission instruction, and ignore (or discard) the UL transmission instruction. Alternatively, the UE may ignore (or discard) both of the DL transmission instruction and the UL transmission instruction, and may not perform any operation. The UE may discard a UL transmission operation (e.g., HARQ-ACK feedback) accompanying DL reception of a DL transmission instruction together when discarding the DL transmission instruction, and a DL reception operation (e.g., aperiodic CSI-RS reception operation) or a UL transmission operation (e.g., SRS transmission operation) accompanying UL transmission of a UL transmission instruction together when discarding the UL transmission instruction.

In the cases 5 and 8, transmission/reception whose transmission directions are different are configured to the CC 1 and the CC 2 by downlink control information and a higher layer signaling in a given duration. For example, a UL transmission instruction (e.g., at least one of a UL grant and a UL slot format instruction) is instructed to one of the CC 1 and the CC 2 by DCI, and a DL transmission instruction (e.g., DL configuration) is instructed to the other one of the CC 1 and the CC 2 by a higher layer signaling. The UE may decide this case as an error case.

When deciding this case as the error case, the UE may expect that the UL transmission instruction (e.g., at least one of the UL grant and the UL slot format instruction) for a given duration is not instructed by the DCI. Furthermore, the UE may expect that the DL transmission instruction (e.g., DL configuration) for the given duration is not instructed by the higher layer signaling (or semi-statically). Furthermore, when the UL transmission instruction is given by the DCI and the DL transmission instruction is given by the higher layer signaling, the UE may prioritize the UL transmission instruction, and ignore (or discard) the DL transmission instruction. Alternatively, the UE may ignore (or discard) both of the DL transmission instruction and the UL transmission instruction, and may not perform any operation.

In the cases 11 and 15, transmission/reception whose transmission directions are different are configured to the CC 1 and the CC 2 by downlink control information in a given duration. For example, in the case 11, a DL transmission instruction (e.g., DL assignment) is transmitted to the CC 1 by DCI, and a UL transmission instruction (e.g., at least one of a UL grant and a UL slot format instruction) is transmitted to the CC 2 by the DCI. In the case 15, a UL transmission instruction (e.g., a UL grant) is transmitted to the CC 1 by DCI, and a DL transmission instruction (e.g., at least one of a DL assignment and a DL slot format instruction) is transmitted to the CC 2 by the DCI. The UE may decide this case as an error case. When deciding this case as the error case, the UE may operate similar to the error cases described in the cases 3 and 7.

In the cases 14 and 18, transmission/reception whose transmission directions are different are configured to the CC 1 and the CC 2 by a higher layer signaling (or semi-statically) in a given duration. For example, a DL transmission instruction (e.g., DL configuration) and a UL transmission instruction (e.g., UL configuration) are each configured to the CC 1 and the CC 2 by the higher layer signaling (or semi-statically). The UE may decide this case as an error case. When deciding this case as the error case, the UE may operate similar to the error cases described in the cases 6 and 10.

In the cases 12 and 17, a DL transmission instruction is instructed to one of the CC 1 and the CC 2 by DCI, and a UL transmission instruction is instructed to the other one of the CC 1 and the CC 2 by a higher layer signaling. For example, in the case 12, the DL transmission instruction (e.g., DL assignment) is transmitted to the CC 1 by the DCI, and the UL transmission instruction (e.g., UL configuration) is instructed to the CC 2 by the higher layer signaling. In the case 17, the UL transmission instruction (e.g., UL configuration) is instructed to the CC 1 by the higher layer signaling, and the DL transmission instruction (e.g., at least one of the DL assignment and a DL slot format instruction) is transmitted to the CC 2 by the DCI. The UE may decide this case as an error case. When deciding this case as the error case, the UE may operate similar to the error cases described in the cases 4 and 9.

In the cases 13 and 16, a UL transmission instruction is instructed to one of the CC 1 and the CC 2 by DCI, and a DL transmission instruction is instructed to the other one of the CC 1 and the CC 2 by a higher layer signaling. For example, in the case 13, the DL transmission instruction (e.g., DL configuration) is instructed to the CC 1 by the higher layer signaling, and the UL transmission instruction (e.g., at least one of a UL grant and a UL slot format instruction) is transmitted to the CC 2 by the DCI. In the case 16, the UL transmission instruction (e.g., UL grant) is transmitted to the CC 1 by the DCI, and the DL transmission instruction (e.g., DL configuration) is instructed to the CC 2 by the higher layer signaling. The UE may decide this case as an error case. When deciding this case as the error case, the UE may operate similar to the error cases described in the cases 5 and 8.

Thus, according to the UE operation 1, a case where transmission directions that are different between a plurality of cells (e.g., the CC 1 and the CC 2) for which slot formats are configured to Flexible (F) are instructed in a given duration is decided as an error case, and a half-duplex operation is performed. Consequently, it is possible to simplify a UE operation in a case where the half-duplex operation is performed between a plurality of cells.

<UE Operation 2>

FIG. 4 is a diagram illustrating one example of a UE operation in a case where a plurality of cells (the CC 1 and the CC 2 in this case) are used. More specifically, FIG. 4 illustrates the UE operation (cases 1 to 18) in a case where different transmission directions are configured to the CC 1 and the CC 2 in a given duration (e.g., a given slot or a given symbol duration). Configuring the transmission directions may be read as one of instructions of UL transmission, DL reception, a dynamic UL slot format and a dynamic DL slot format.

According to the UE operation 2, when transmission/reception whose transmission directions are different are instructed to a plurality of cells (e.g., the CC 1 and the CC 2) for which slot formats are configured to Flexible (F), a UE operation may be controlled based on a cell type and at least one of a method (e.g., a control signal type) for instructing transmission/reception and a method (e.g., control signal type) for instructing a slot format.

When, for example, transmission directions of transmission/reception or a slot format instructed by Downlink Control Information (DCI), and transmission/reception instructed by a higher layer signaling (or semi-statically) are different, the UE may prioritize one of the signal types (e.g., DCI) for a given cell (also referred to as a reference cell).

That is, transmission/reception instructed to a certain cell (e.g., transmission/reception configured by the higher layer signaling) are configured to be canceled by transmission/reception instructed to the given cell (e.g., transmission/reception scheduled by the DCI). On the other hand, transmission/reception instructed to the given cell (e.g., transmission/reception configured by the higher layer signaling) are configured to not be canceled by transmission/reception instructed to the another cell (e.g., transmission/reception scheduled by the DCI).

When a plurality of cells include a Primary Cell (PCell), the given cell (reference cell) may be the PCell. Furthermore, when a plurality of cells do not include the PCell and include a Primary SCell (PSCell), the PSCell may be a reference cell. Furthermore, when a plurality of cells do not include the PCell and the PSCell, an SCell of a given index (e.g., minimum index) may be defined as a reference cell.

FIG. 4 illustrates a case where the CC 1 corresponds to a given cell and the CC 2 corresponds to another cell. In this case, transmission/reception instructed to the CC 2 (e.g., transmission/reception configured by a higher layer signaling) are canceled by transmission/reception instructed to the CC 1 (e.g., transmission/reception scheduled by DCI) (cases 4, 8, 12 and 16). On the other hand, transmission/reception instructed to the CC 1 (e.g., transmission/reception configured by the higher layer signaling) are configured to not be canceled by transmission/reception instructed to the CC 2 (e.g., transmission/reception scheduled by the DCI) (cases 5, 9, 13 and 17).

For example, in the case 4, the DL transmission instruction (e.g., at least one of the DL assignment and the DL slot format instruction) is transmitted to the CC 1 that serves as a reference cell by the DCI, and the UL transmission instruction (e.g., UL configuration) is instructed to the CC 2 by the higher layer signaling. In this case, the UE may perform control to perform DL reception in the CC 1 and to not perform UL transmission in the CC 2.

That is, UL transmission semi-statically configured to the CC 2 may be canceled by at least one of the DL assignment and the DL slot format instruction notified in the CC 1. In this regard, the UE may be configured to cancel UL transmission when a sufficient time can be reserved until the UL configuration is canceled.

In the case 8, the UL transmission instruction (e.g., at least one of the UL grant and the UL slot format instruction) is transmitted to the CC 1 that serves as the reference cell by the DCI, and the DL transmission instruction (e.g., DL configuration) is instructed to the CC 2 by the higher layer signaling. In this case, the UE may perform control to perform UL transmission in the CC 1 and to not perform DL reception in the CC 2.

That is, DL reception semi-statically configured to the CC 2 may be canceled by at least one of the UL grant and the UL slot format instruction notified in the CC 1.

In the case 12, the DL transmission instruction (e.g., the DL assignment) is transmitted to the CC 1 that serves as the reference cell by the DCI, and the UL transmission instruction (e.g., UL configuration) is instructed to the CC 2 by the higher layer signaling. In this case, the UE may perform control to perform DL reception in the CC 1 and to not perform UL transmission in the CC 2.

In the case 16, the UL transmission instruction (e.g., UL grant) is transmitted to the CC 1 that serves as the reference cell by the DCI, and the DL transmission instruction (e.g., DL configuration) is instructed to the CC 2 by the higher layer signaling. In this case, the UE may perform control to perform UL transmission in the CC 1 and to not perform DL reception in the CC 2.

In addition, in the other cases (cases 1 to 3, 5 to 7, 9 to 11, 13 to 15, 17 and 18), control may be performed similar to the UE operation 1 (e.g., error case).

Thus, according to the UE operation 2, when transmission directions that are different between a plurality of cells (e.g., the CC 1 and the CC 2) for which the slot formats are configured to Flexible (F) are instructed in the given duration, transmission/reception are controlled based on a cell type and a method used to instruct the transmission directions. Consequently, when the instruction of the transmission directions to the given cell is configured by a first method (e.g., downlink control information), and the instruction of the transmission directions to the another cell is configured by a second method (e.g., higher layer signaling), it is possible to perform transmission/reception in the given cell. Consequently, even when a half-duplex operation is performed between a plurality of cells to which Flexible (F) is configured, it is possible to increase transmission occasions in the given cell.

In addition, even when a method (e.g., signal type) for instructing transmission/reception in each cell is the same, and when different transmission directions are instructed, transmission/reception in the given cell (reference cell) may be preferentially applied. For example, transmission/reception in the CC 1 may be configured to be performed without deciding at least one of the cases 3, 6, 7, 10, 14, 15 and 18 as an error case.

<UE Operation 3>

FIG. 5 is a diagram illustrating one example of a UE operation in a case where a plurality of cells (the CC 1 and the CC 2 in this case) are used. More specifically, FIG. 5 illustrates the UE operation (cases 1 to 18) in a case where different transmission directions are configured to the CC 1 and the CC 2 in a given duration (e.g., a given slot or a given symbol duration). Configuring the transmission directions may be read as one of instructions of UL transmission, DL reception, a dynamic UL slot format and a dynamic DL slot format.

According to the UE operation 3, when transmission/reception in the different transmission directions are instructed to a plurality of cells (e.g., the CC 1 and the CC 2) for which slot formats are configured to Flexible (F), a UE operation may be controlled based on at least one of a method (e.g., a control signal type) for instructing transmission/reception and a method (e.g., control signal type) for instructing a slot format irrespectively of a cell type.

When, for example, transmission directions of transmission/reception or a slot format instructed by Downlink Control Information (DCI), and transmission/reception instructed by a higher layer signaling (or semi-statically) are different, the UE may prioritize one of the signal types (e.g., DCI).

That is, transmission/reception configured by the first method (e.g., higher layer signaling) are configured to be canceled by transmission/reception instructed by the second method (e.g., DCI) between a plurality of cells to which Flexible (F) has been configured by the higher layer signaling.

In FIG. 5, transmission/reception instructed to the CC 2 (e.g., transmission/reception configured by a higher layer signaling) are canceled by transmission/reception instructed to the CC 1 (e.g., transmission/reception scheduled by DCI) (cases 4, 8, 12 and 16). Furthermore, transmission/reception instructed to the CC 1 (e.g., transmission/reception configured by the higher layer signaling) are canceled by transmission/reception instructed to the CC 2 (e.g., transmission/reception scheduled by the DCI) (cases 5, 9, 13 and 17).

For example, in the cases 5 and 13, the DL transmission instruction (e.g., DL configuration) is instructed to the CC 1 by the higher layer signaling, and the UL transmission instruction (e.g., at least one of the UL grant and the UL slot format instruction) is transmitted to the CC 2 by the DCI. In this case, the UE may perform control to perform UL transmission in the CC 2 and to not perform DL reception in the CC 1.

That is, DL reception semi-statically configured to the CC 1 may be canceled by at least one of the UL grant and the UL slot format instruction notified in the CC 2.

In the cases 9 and 17, the UL transmission instruction (e.g., UL configuration) is instructed to the CC 1 by the higher layer signaling, and the DL transmission instruction (e.g., at least one of the DL assignment and the DL slot format instruction) is transmitted to the CC 2 by the DCI. In this case, the UE may perform control to perform DL reception in the CC 2 and to not perform UL transmission in the CC 1.

That is, UL transmission semi-statically configured to the CC 1 may be canceled by at least one of the DL assignment and the DL slot format instruction notified in the CC 2. In this regard, the UE may be configured to cancel UL transmission when a sufficient time can be reserved until the UL configuration is canceled.

In addition, in the other cases (cases 4, 8, 12 and 16), control may be performed similar to the UE operation 2 (e.g., transmission/reception in the CC 1 are performed, and transmission/reception in the CC 2 are canceled). In the other cases (cases 1 to 3, 6, 7, 10, 11, 14, 15 and 18), control may be performed similar to the UE operation 1 (e.g., error case).

Thus, according to the UE operation 3, when transmission directions that are different between a plurality of cells (e.g., the CC 1 and the CC 2) for which the slot formats are configured to Flexible (F) are instructed in the given duration, transmission/reception are controlled based on a method used to instruct the transmission directions irrespectively of the cell type. Consequently, even when a half-duplex operation is performed between a plurality of cells to which Flexible (F) is configured, it is possible to effectively increase transmission occasions in a given cell.

In addition, transmission/reception in each cell may be controlled based on a method (e.g., a signal type used for notification) for configuring a slot format. For example, in a case where a slot format is configured to the CC 1 by using downlink control information (e.g., cases 10 to 18), transmission/reception in the CC 1 may be configured to not be canceled by another cell (e.g., CC 2). For example, in FIG. 5, control may be performed such that transmission/reception in the CC 1 are not canceled by the CC 2 in the cases 13 and 17 (e.g., error case).

(Radio Communication System)

The configuration of the radio communication system according to one embodiment of the present disclosure will be described below. This radio communication system uses one or a combination of the radio communication method according to each of the above embodiment of the present disclosure to perform communication.

FIG. 6 is a diagram illustrating one example of a schematic configuration of the radio communication system according to the one embodiment. A radio communication system 1 may be a system that realizes communication by using Long Term Evolution (LTE) or the 5th generation mobile communication system New Radio (5G NR) specified by the Third Generation Partnership Project (3GPP).

Furthermore, the radio communication system 1 may support dual connectivity between a plurality of Radio Access Technologies (RATs) (Multi-RAT Dual Connectivity (MR-DC)). MR-DC may include, for example, dual connectivity of LTE (Evolved Universal Terrestrial Radio Access (E-UTRA)) and NR (E-UTRA-NR Dual Connectivity (EN-DC)), and dual connectivity of NR and LTE (NR-E-UTRA Dual Connectivity (NE-DC)).

According to EN-DC, a base station (eNB) of LTE (E-UTRA) is a Master Node (MN), and a base station (gNB) of NR is a Secondary Node (SN). According to NE-DC, a base station (gNB) of NR is an MN, and a base station (eNB) of LTE (E-UTRA) is an SN.

The radio communication system 1 may support dual connectivity between a plurality of base stations in an identical RAT (e.g., dual connectivity (NR-NR Dual Connectivity (NN-DC)) where both of the MN and the SN are base stations (gNBs) according to NR).

The radio communication system 1 includes a base station 11 that forms a macro cell C1 of a relatively wide coverage, and base stations 12 (12a to 12c) that are located in the macro cell C1 and form small cells C2 narrower than the macro cell C1. The user terminal 20 may be located in at least one cell. An arrangement and the numbers of respective cells and the user terminals 20 are not limited to the aspect illustrated in FIG. 6. The base stations 11 and 12 will be collectively referred to as a base station 10 below when not distinguished.

The user terminal 20 can connect with at least one of a plurality of base stations 10. The user terminal 20 may use at least one of Carrier Aggregation (CA) and Dual Connectivity (DC) that uses a plurality of Component Carriers (CCs).

Each CC may be included in at least one of a first frequency range (Frequency Range 1 (FR1)) and a second frequency range (Frequency Range 2 (FR2)). The macro cell C1 may be included in the FR1, and the small cell C2 may be included in the FR2. For example, the FR1 may be a frequency range equal to or less than 6 GHz (sub-6 GHz), and the FR2 may be a frequency range higher than 24 GHz (above-24 GHz). In addition, the frequency ranges and definitions of the FR1 and the FR2 are not limited to these, and for example, the FR1 may correspond to a frequency range higher than the FR2.

Furthermore, the user terminal 20 may perform communication by using at least one of Time Division Duplex (TDD) and Frequency Division Duplex (FDD) in each CC.

A plurality of base stations 10 may be connected by way of wired connection (e.g., optical fibers compliant with a Common Public Radio Interface (CPRI) or an X2 interface) or radio connection (e.g., NR communication). When, for example, NR communication is used as backhaul between the base stations 11 and 12, the base station 11 corresponding to a higher station may be referred to as an Integrated Access Backhaul (IAB) donor, and the base station 12 corresponding to a relay station (relay) may be referred to as an IAB node.

The base station 10 may be connected with a core network 30 via the another base station 10 or directly. The core network 30 may include at least one of, for example, an Evolved Packet Core (EPC), a 5G Core Network (5GCN) and a Next Generation Core (NGC).

The user terminal 20 is a terminal that supports at least one of communication schemes such as LTE, LTE-A and 5G.

The radio communication system 1 may use an Orthogonal Frequency Division Multiplexing (OFDM)-based radio access scheme. For example, on at least one of Downlink (DL) and Uplink (UL), Cyclic Prefix OFDM (CP-OFDM), Discrete Fourier Transform Spread OFDM (DFT-s-OFDM), Orthogonal Frequency Division Multiple Access (OFDMA) and Single Carrier Frequency Division Multiple Access (SC-FDMA) may be used.

The radio access scheme may be referred to as a waveform. In addition, the radio communication system 1 may use another radio access scheme (e.g., another single carrier transmission scheme or another multicarrier transmission scheme) as the radio access scheme on UL and DL.

The radio communication system 1 may use a downlink shared channel (Physical Downlink Shared Channel (PDSCH)) shared by each user terminal 20, a broadcast channel (Physical Broadcast Channel (PBCH)) and a downlink control channel (Physical Downlink Control Channel (PDCCH)) as downlink channels.

Furthermore, the radio communication system 1 uses an uplink shared channel (Physical Uplink Shared Channel (PUSCH)) shared by each user terminal 20, an uplink control channel (Physical Uplink Control Channel (PUCCH)) and a random access channel (Physical Random Access Channel (PRACH)) as uplink channels.

User data, higher layer control information and a System Information Block (SIB) are conveyed on the PDSCH. The user data and the higher layer control information may be conveyed on the PUSCH. Furthermore, a Master Information Block (MIB) may be conveyed on the PBCH.

Lower layer control information may be conveyed on the PDCCH. The lower layer control information may include, for example, Downlink Control Information (DCI) including scheduling information of at least one of the PDSCH and the PUSCH.

In addition, DCI for scheduling the PDSCH may be referred to as a DL assignment or DL DCI, and DCI for scheduling the PUSCH may be referred to as a UL grant or UL DCI. In this regard, the PDSCH may be read as DL data, and the PUSCH may be read as UL data.

A COntrol REsource SET (CORESET) and a search space may be used to detect the PDCCH. The CORESET is associated with a resource for searching DCI. The search space is associated with a search domain and a search method of PDCCH candidates. One CORESET may be associated with one or a plurality of search spaces. The UE may monitor a CORESET associated with a certain search space based on a search space configuration.

One search space may be associated with a PDCCH candidate corresponding to one or a plurality of aggregation levels. One or a plurality of search spaces may be referred to as a search space set. In addition, a "search space", a "search space set", a "search space configuration", a "search space set configuration", a "CORESET" and a "CORESET configuration" in the present disclosure may be interchangeably read.

Uplink Control Information (UCI) including at least one of Channel State Information (CSI), transmission acknowledgement information (that may be referred to as, for example, Hybrid Automatic Repeat reQuest ACKnowledgement (HARQ-ACK) or ACK/NACK) and a Scheduling Request (SR) may be conveyed on the PUCCH. A random access preamble for establishing connection with a cell may be conveyed on the PRACH.

In addition, downlink and uplink in the present disclosure may be expressed without adding "link" thereto. Furthermore, various channels may be expressed without adding "physical" to heads of the various channels.

The radio communication system 1 may convey a Synchronization Signal (SS) and a Downlink Reference Signal (DL-RS). The radio communication system 1 conveys a Cell-specific Reference Signal (CRS), a Channel State Information-Reference Signal (CSI-RS), a DeModulation Reference Signal (DMRS), a Positioning Reference Signal (PRS) and a Phase Tracking Reference Signal (PTRS) as DL-RSs.

The synchronization signal may be at least one of, for example, a Primary Synchronization Signal (PSS) and a Secondary Synchronization Signal (SSS). A signal block including the SS (the PSS or the SSS) and the PBCH (and the DMRS for the PBCH) may be referred to as an SS/PBCH block or an SS Block (SSB). In addition, the SS and the SSB may be referred to as reference signals.

Furthermore, the radio communication system 1 may convey a Sounding Reference Signal (SRS) and a DeModulation Reference Signal (DMRS) as UpLink Reference Signals (UL-RSs). In this regard, the DMRS may be referred to as a user terminal-specific reference signal (UE-specific reference signal).

(Base Station)

Figure 7:
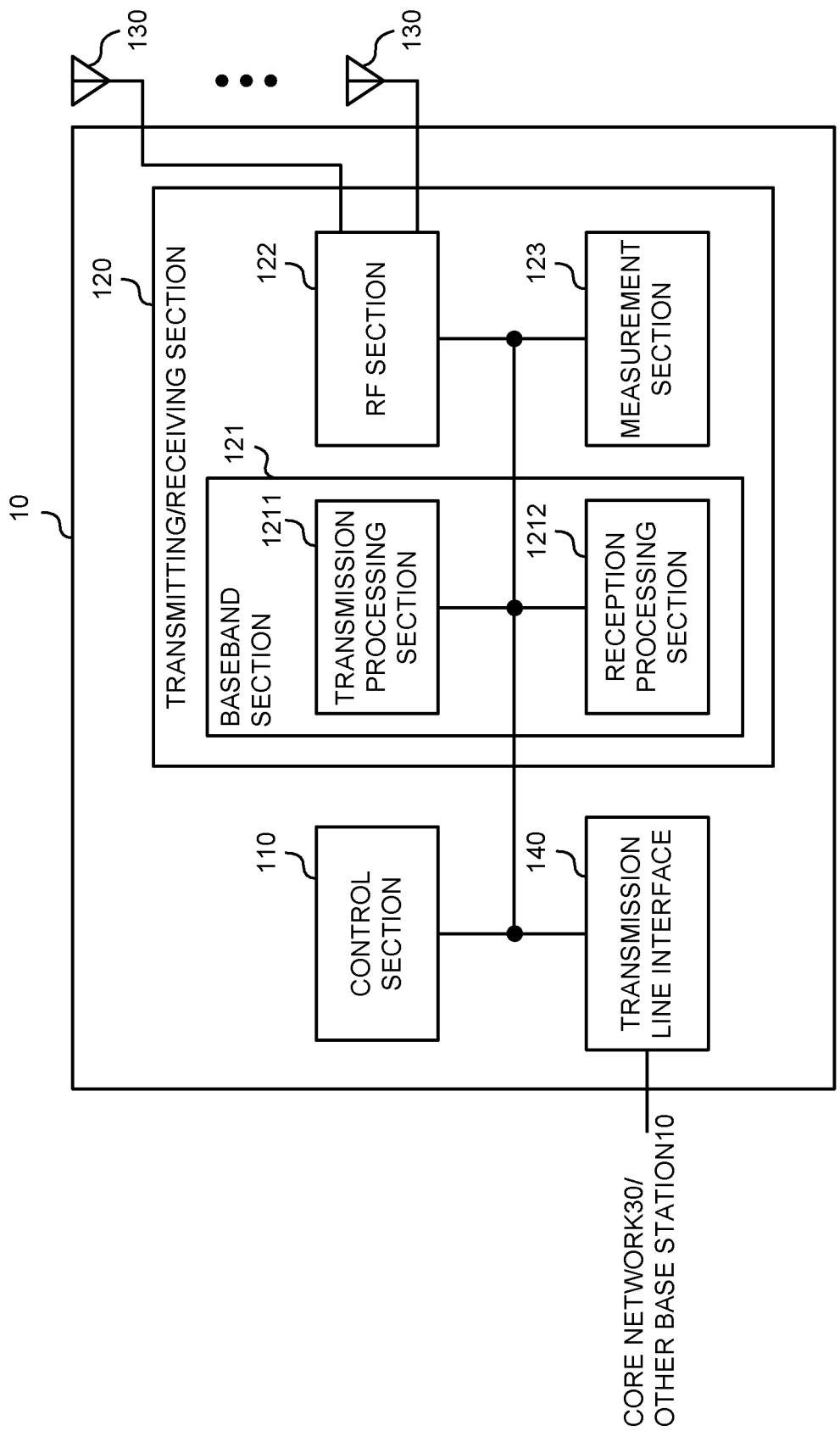
FIG. 7 is a diagram illustrating one example of a configuration of a base station according to the one embodiment.

FIG. 7 is a diagram illustrating one example of a configuration of the base station according to the one embodiment. The base station 10 includes a control section 110, a transmission/reception section 120, transmission/reception antennas 130 and a transmission line interface 140. In addition, the base station 10 may include one or more of each of the control sections 110, the transmission/reception sections 120, the transmission/reception antennas 130 and the transmission line interfaces 140.

In addition, this example mainly illustrates function blocks of characteristic portions according to the present embodiment, and may assume that the base station 10 includes other function blocks, too, that are necessary for radio communication. Part of processing of each section described below may be omitted.

The control section 110 controls the entire base station 10. The control section 110 can be composed of a controller or a control circuit described based on the common knowledge in the technical field according to the present disclosure.

The control section 110 may control signal generation and scheduling (e.g., resource allocation or mapping). The control section 110 may control transmission/reception and measurement that use the transmission/reception section 120, the transmission/reception antennas 130 and the transmission line interface 140. The control section 110 may generate data, control information or a sequence to be transmitted as a signal, and forward the signal to the transmission/reception section 120. The control section 110 may perform call processing (such as configuration and release) of a communication channel, state management of the base station 10 and radio resource management.

The transmission/reception section 120 may include a baseband section 121, a Radio Frequency (RF) section 122 and a measurement section 123. The baseband section 121 may include a transmission processing section 1211 and a reception processing section 1212. The transmission/reception section 120 can be composed of a transmitter/receiver, an RF circuit, a baseband circuit, a filter, a phase shifter, a measurement circuit or a transmission/reception circuit described based on the common knowledge in the technical field according to the present disclosure.

The transmission/reception section 120 may be composed as an integrated transmission/reception section, or may be composed of a transmission section and a reception section. The transmission section may be composed of the transmission processing section 1211 and the RF section 122. The reception section may be composed of the reception processing section 1212, the RF section 122 and the measurement section 123.

The transmission/reception antenna 130 can be composed of an antenna such an array antenna described based on the common knowledge in the technical field according to the present disclosure.

The transmission/reception section 120 may transmit the above-described downlink channel, synchronization signal and downlink reference signal. The transmission/reception section 120 may receive the above-described uplink channel and uplink reference signal.

The transmission/reception section 120 may form at least one of a transmission beam and a reception beam by using digital beam forming (e.g., precoding) or analog beam forming (e.g., phase rotation).

The transmission/reception section 120 (transmission processing section 1211) may perform Packet Data Convergence Protocol (PDCP) layer processing, Radio Link Control (RLC) layer processing (e.g., RLC retransmission control), and Medium Access Control (MAC) layer processing (e.g., HARQ retransmission processing) on, for example, the data and the control information obtained from the control section 110, and generate a bit sequence to transmit.

The transmission/reception section 120 (transmission processing section 1211) may perform transmission processing such as channel coding (that may include error correction coding), modulation, mapping, filter processing, Discrete Fourier Transform (DFT) processing (when needed), Inverse Fast Fourier Transform (IFFT) processing, precoding and digital-analog conversion on the bit sequence to transmit, and output a baseband signal.

The transmission/reception section 120 (RF section 122) may modulate the baseband signal into a radio frequency range, perform filter processing and amplification on the signal, and transmit the signal of the radio frequency range via the transmission/reception antennas 130.

On the other hand, the transmission/reception section 120 (RF section 122) may perform amplification and filter processing on the signal of the radio frequency range received by the transmission/reception antennas 130, and demodulate the signal into a baseband signal.

The transmission/reception section 120 (reception processing section 1212) may apply reception processing such as analog-digital conversion, Fast Fourier Transform (FFT) processing, Inverse Discrete Fourier Transform (IDFT) processing (when needed), filter processing, demapping, demodulation, decoding (that may include error correction decoding), MAC layer processing, RLC layer processing and PDCP layer processing on the obtained baseband signal, and obtain user data.

The transmission/reception section 120 (measurement section 123) may perform measurement related to the received signal. For example, the measurement section 123 may perform Radio Resource Management (RRM) measurement or Channel State Information (CSI) measurement based on the received signal. The measurement section 123 may measure received power (e.g., Reference Signal Received Power (RSRP)), received quality (e.g., Reference Signal Received Quality (RSRQ), a Signal to Interference plus Noise Ratio (SINR) or a Signal to Noise Ratio (SNR)), a signal strength (e.g., a Received Signal Strength Indicator (RSSI)) or channel information (e.g., CSI). The measurement section 123 may output a measurement result to the control section 110.

The transmission line interface 140 may transmit and receive (backhaul signaling) signals to and from apparatuses and the other base stations 10 included in the core network 30, and obtain and convey user data (user plane data) and control plane data for the user terminal 20.

In addition, the transmission section and the reception section of the base station 10 according to the present disclosure may be composed of at least one of the transmission/reception section 120, the transmission/reception antenna 130 and the transmission line interface 140.

In addition, the transmission/reception section 120 may transmit information (slot format information) that indicates a slot format of a cell and relates to the slot format by using at least one of a higher layer signaling (e.g., RRC signaling) and DCI. Furthermore, the transmission/reception section 120 may transmit at least one of the downlink control information (e.g., UL grant) and the higher layer signaling that instructs UL transmission in a UE. Furthermore, the transmission/reception section 120 may transmit at least one of the downlink control information (e.g., DL assignment) and the higher layer signaling that instructs DL reception in the UE.

The control section 110 may control a slot format configured to each cell. Furthermore, the control section 110 may control UL transmission or DL reception in each cell based on a cell type, and at least one of a method (e.g., a signal type used for an instruction) for instructing the slot format of each cell and a method (e.g., a signal type used for an instruction) for instructing transmission/reception in each cell.

(User Terminal)

Figure 8:
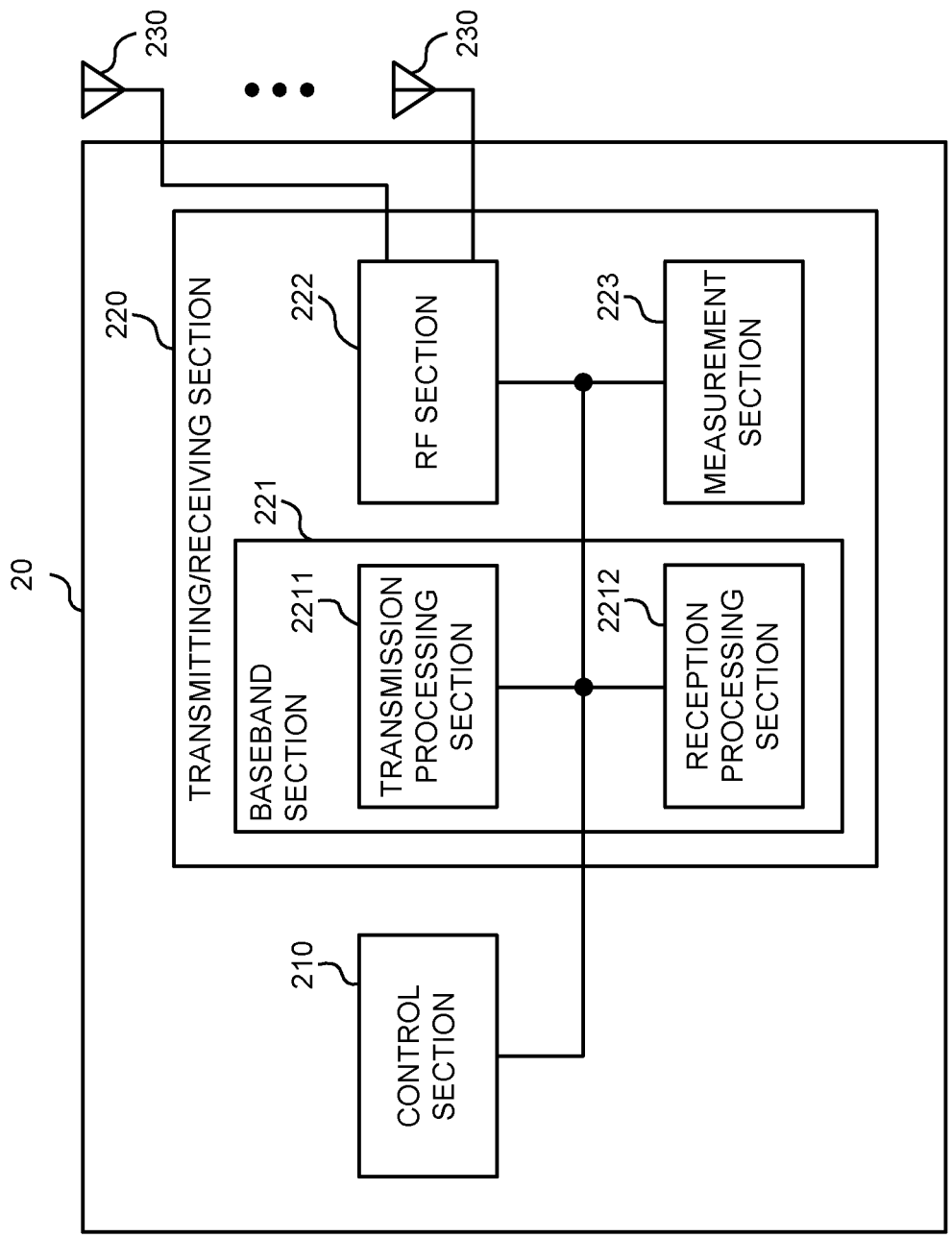
FIG. 8 is a diagram illustrating one example of a configuration of a user terminal according to the one embodiment.

FIG. 8 is a diagram illustrating one example of a configuration of the user terminal according to the one embodiment. The user terminal 20 includes a control section 210, a transmission/reception section 220 and transmission/reception antennas 230. In this regard, the user terminal 20 may include one or more of each of the control sections 210, the transmission/reception sections 220 and transmission/reception antennas 230.

In addition, this example mainly illustrates function blocks of characteristic portions according to the present embodiment, and may assume that the user terminal 20 includes other function blocks, too, that are necessary for radio communication. Part of processing of each section described below may be omitted.

The control section 210 controls the entire user terminal 20. The control section 210 can be composed of a controller or a control circuit described based on the common knowledge in the technical field according to the present disclosure.

The control section 210 may control signal generation and mapping. The control section 210 may control transmission/reception and measurement that use the transmission/reception section 220 and the transmission/reception antennas 230. The control section 210 may generate data, control information or a sequence to be transmitted as a signal, and forward the signal to the transmission/reception section 220.

The transmission/reception section 220 may include a baseband section 221, an RF section 222 and a measurement section 223. The baseband section 221 may include a transmission processing section 2211 and a reception processing section 2212. The transmission/reception section 220 can be composed of a transmitter/receiver, an RF circuit, a baseband circuit, a filter, a phase shifter, a measurement circuit or a transmission/reception circuit described based on the common knowledge in the technical field according to the present disclosure.

The transmission/reception section 220 may be composed as an integrated transmission/reception section, or may be composed of a transmission section and a reception section. The transmission section may be composed of the transmission processing section 2211 and the RF section 222. The reception section may be composed of the reception processing section 2212, the RF section 222 and the measurement section 223.

The transmission/reception antenna 230 can be composed of an antenna such an array antenna described based on the common knowledge in the technical field according to the present disclosure.

The transmission/reception section 220 may transmit the above-described downlink channel, synchronization signal and downlink reference signal. The transmission/reception section 220 may receive the above-described uplink channel and uplink reference signal.

The transmission/reception section 220 may form at least one of a transmission beam and a reception beam by using digital beam forming (e.g., precoding) or analog beam forming (e.g., phase rotation).

The transmission/reception section 220 (transmission processing section 2211) may perform PDCP layer processing, RLC layer processing (e.g., RLC retransmission control) and MAC layer processing (e.g., HARQ retransmission processing) on, for example, the data and the control information obtained from the control section 210, and generate a bit sequence to transmit.

The transmission/reception section 220 (transmission processing section 2211) may perform transmission processing such as channel coding (that may include error correction coding), modulation, mapping, filter processing, DFT processing (when needed), IFFT processing, precoding and digital-analog conversion on the bit sequence to transmit, and output a baseband signal.

In this regard, whether or not to apply the DFT processing may be based on a configuration of transform precoding. When transform precoding is enabled for a certain channel (e.g., PUSCH), the transmission/reception section 220 (transmission processing section 2211) may perform the DFT processing as the above transmission processing to transmit the certain channel by using a DFT-s-OFDM waveform. When precoding is not enabled, the transmission/reception section 220 (transmission processing section 2211) may not perform the DFT processing as the above transmission processing.

The transmission/reception section 220 (RF section 222) may modulate the baseband signal into a radio frequency range, perform filter processing and amplification on the signal, and transmit the signal of the radio frequency range via the transmission/reception antennas 230.

On the other hand, the transmission/reception section 220 (RF section 222) may perform amplification and filter processing on the signal of the radio frequency range received by the transmission/reception antennas 230, and demodulate the signal into a baseband signal.

The transmission/reception section 220 (reception processing section 2212) may apply reception processing such as analog-digital conversion, FFT processing, IDFT processing (when needed), filter processing, demapping, demodulation, decoding (that may include error correction decoding), MAC layer processing, RLC layer processing and PDCP layer processing on the obtained baseband signal, and obtain user data.

The transmission/reception section 220 (measurement section 223) may perform measurement related to the received signal. For example, the measurement section 223 may perform RRM measurement or CSI measurement based on the received signal. The measurement section 223 may measure received power (e.g., RSRP), received quality (e.g., RSRQ, an SINR or an SNR), a signal strength (e.g., RSSI) or channel information (e.g., CSI). The measurement section 223 may output a measurement result to the control section 210.

In addition, the transmission section and the reception section of the user terminal 20 according to the present disclosure may be composed of at least one of the transmission/reception section 220, the transmission/reception antenna 230 and the transmission line interface 240.

In addition, the transmission/reception section 220 may receive the information (slot format information) that indicates the slot format of the cell and relates to the slot format by using at least one of the higher layer signaling (e.g., RRC signaling) and the DCI. Furthermore, the transmission/reception section 220 may receive at least one of the downlink control information (e.g., UL grant) and the higher layer signaling that instructs UL transmission in the UE. Furthermore, the transmission/reception section 220 may receive at least one of the downlink control information (e.g., DL assignment) and the higher layer signaling that instructs DL reception in the UE.

When transmission/reception whose transmission directions are different between a plurality of cells for which slot formats are configured to flexible are instructed, the control section 210 may perform control to perform transmission/reception in a given cell and to not perform transmission/reception in another cell based on a method for instructing transmission/reception in each cell. An instruction of transmission/reception to the given cell may be given by the downlink control information, and an instruction of transmission/reception to the another cell may be given by the higher layer signaling. Furthermore, the given cell (also referred to as a reference cell) may be a cell defined in advance.

Alternatively, the control section 210 may decide as an error case a case where transmission/reception whose transmission directions are different between a plurality of cells for which the slot formats are configured to flexible are instructed. When, for example, an instruction of transmission/reception to a first cell is given by the downlink control information, an instruction of transmission/reception to a second cell is given by the higher layer signaling, and transmission directions of transmission/reception instructed to the first cell and the second cell are different, the control section 210 may perform control to not perform transmission/reception in the first cell and the second cell.

(Hardware Configuration)

In addition, the block diagrams used to describe the above embodiment illustrate blocks in function units. These function blocks (components) are realized by an arbitrary combination of at least ones of hardware components and software components. Furthermore, a method for realizing each function block is not limited in particular. That is, each function block may be realized by using one physically or logically coupled apparatus or may be realized by using a plurality of these apparatuses formed by connecting two or more physically or logically separate apparatuses directly or indirectly (by using, for example, wired connection or radio connection). Each function block may be realized by combining software with the above one apparatus or a plurality of above apparatuses.

In this regard, the functions include judging, determining, deciding, calculating, computing, processing, deriving, investigating, looking up, ascertaining, receiving, transmitting, outputting, accessing, resolving, selecting, choosing, establishing, comparing, assuming, expecting, considering, broadcasting, notifying, communicating, forwarding, configuring, reconfiguring, allocating, mapping, and assigning, yet are not limited to these. For example, a function block (component) that causes transmission to function may be referred to as a transmitting unit or a transmitter. As described above, the method for realizing each function block is not limited in particular.

Figure 9:
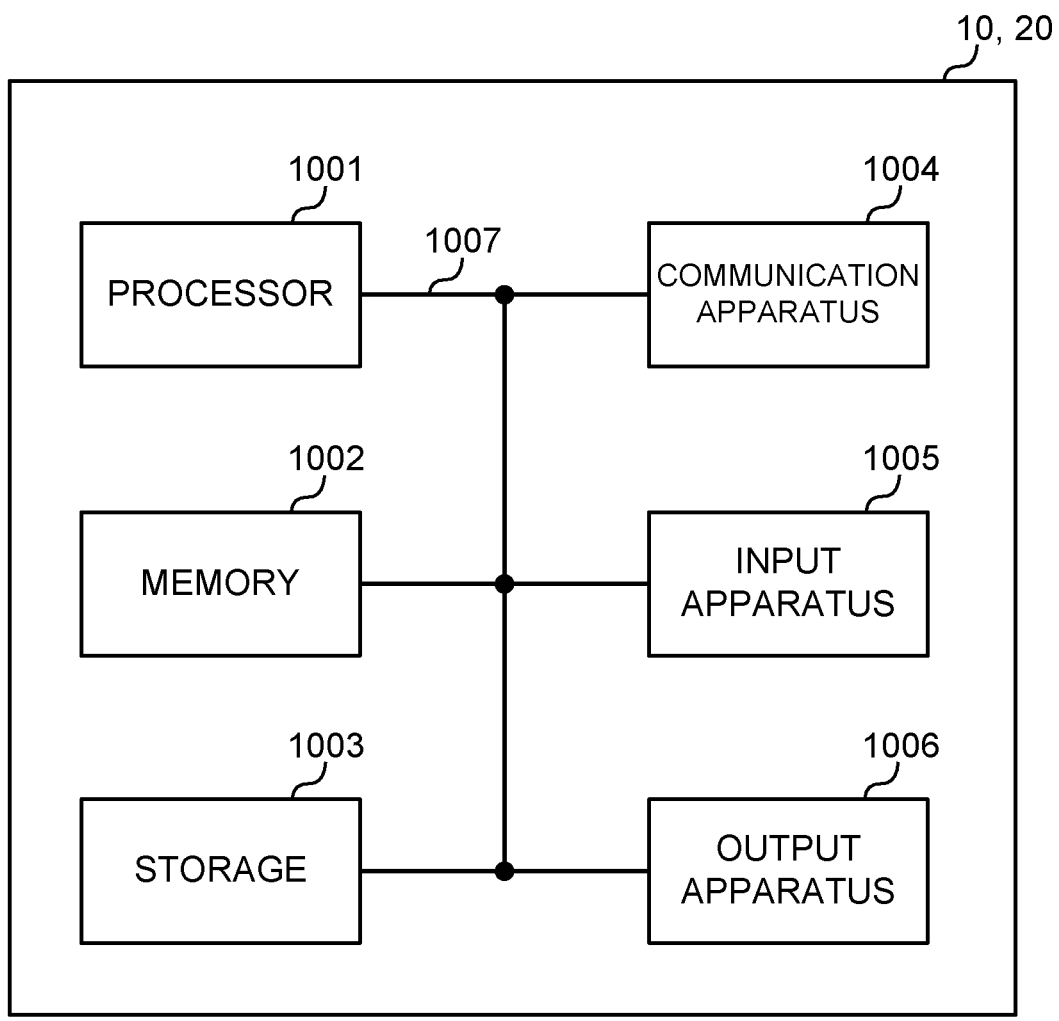
FIG. 9 is a diagram illustrating one example of hardware configurations of the base station and the user terminal according to the one embodiment.

For example, the base station and the user terminal according to the one embodiment of the present disclosure may function as computers that perform processing of the radio communication method according to the present disclosure. FIG. 9 is a diagram illustrating one example of the hardware configurations of the base station and the user terminal according to the one embodiment. The above-described base station 10 and user terminal 20 may be each physically configured as a computer apparatus that includes a processor 1001, a memory 1002, a storage 1003, a communication apparatus 1004, an input apparatus 1005, an output apparatus 1006 and a bus 1007.

In this regard, words such as an apparatus, a circuit, a device, a section and a unit in the present disclosure can be interchangeably read. The hardware configurations of the base station 10 and the user terminal 20 may be configured to include one or a plurality of apparatuses illustrated in FIG. 9 or may be configured without including part of the apparatuses.

For example, FIG. 9 illustrates the only one processor 1001. However, there may be a plurality of processors. Furthermore, processing may be executed by 1 processor or processing may be executed by 2 or more processors concurrently or successively or by using another method. In addition, the processor 1001 may be implemented by 1 or more chips.

Each function of the base station 10 and the user terminal 20 is realized by, for example, causing hardware such as the processor 1001 and the memory 1002 to read given software (program), and thereby causing the processor 1001 to perform an operation, and control communication via the communication apparatus 1004 and control at least one of reading and writing of data in the memory 1002 and the storage 1003.

The processor 1001 causes, for example, an operating system to operate to control the entire computer. The processor 1001 may be composed of a Central Processing Unit (CPU) including an interface for a peripheral apparatus, a control apparatus, an operation apparatus and a register. For example, at least part of the above-described control section 110 (210) and transmission/reception section 120 (220) may be realized by the processor 1001.

Furthermore, the processor 1001 reads programs (program codes), a software module or data from at least one of the storage 1003 and the communication apparatus 1004 out to the memory 1002, and executes various types of processing according to these programs, software module or data. As the programs, programs that cause the computer to execute at least part of the operations described in the above-described embodiment are used. For example, the control section 110 (210) may be realized by a control program that is stored in the memory 1002 and operates on the processor 1001, and other function blocks may be also realized likewise.

The memory 1002 is a computer-readable recording medium, and may be composed of at least one of, for example, a Read Only Memory (ROM), an Erasable Programmable ROM (EPROM), an Electrically EPROM (EEPROM), a Random Access Memory (RAM) and other appropriate storage media. The memory 1002 may be referred to as a register, a cache or a main memory (main storage apparatus). The memory 1002 can store programs (program codes) and a software module that can be executed to perform the radio communication method according to the one embodiment of the present disclosure.

The storage 1003 is a computer-readable recording medium, and may be composed of at least one of, for example, a flexible disk, a floppy (registered trademark) disk, a magnetooptical disk (e.g., a compact disk (Compact Disc ROM (CD-ROM)), a digital versatile disk and a Blu-ray (registered trademark) disk), a removable disk, a hard disk drive, a smart card, a flash memory device (e.g., a card, a stick or a key drive), a magnetic stripe, a database, a server and other appropriate storage media. The storage 1003 may be referred to as an auxiliary storage apparatus.

The communication apparatus 1004 is hardware (transmission/reception device) that performs communication between computers via at least one of a wired network and a radio network, and is also referred to as, for example, a network device, a network controller, a network card and a communication module. The communication apparatus 1004 may be configured to include a high frequency switch, a duplexer, a filter and a frequency synthesizer to realize at least one of, for example, Frequency Division Duplex (FDD) and Time Division Duplex (TDD). For example, the above-described transmission/reception antennas 120 (220) and transmission/reception section 130 (230) may be realized by the communication apparatus 1004. The transmission/reception section 120 (220) may be physically or logically separately implemented as a transmission section 120*a* (220*a*) and a reception section 120*b* (220*b*).

The input apparatus 1005 is an input device (e.g., a keyboard, a mouse, a microphone, a switch, a button or a sensor) that accepts an input from an outside. The output apparatus 1006 is an output device (e.g., a display, a speaker or a Light Emitting Diode (LED) lamp) that sends an output to the outside. In addition, the input apparatus 1005 and the output apparatus 1006 may be an integrated component (e.g., touch panel).

Furthermore, each apparatus such as the processor 1001 or the memory 1002 is connected by the bus 1007 that communicates information. The bus 1007 may be composed by using a single bus or may be composed by using different buses between apparatuses.

Furthermore, the base station 10 and the user terminal 20 may be configured to include hardware such as a microprocessor, a Digital Signal Processor (DSP), an Application Specific Integrated Circuit (ASIC), a Programmable Logic Device (PLD) and a Field Programmable Gate Array (FPGA). The hardware may be used to realize part or entirety of each function block. For example, the processor 1001 may be implemented by using at least one of these hardware components.

Modified Example

In addition, each term that has been described in the present disclosure and each term that is necessary to understand the present disclosure may be replaced with terms having identical or similar meanings. For example, a channel, a symbol and a signal (a signal or a signaling) may be interchangeably read. Furthermore, a signal may be a message. A reference signal can be also abbreviated as an RS, or may be referred to as a pilot or a pilot signal depending on standards to be applied. Furthermore, a Component Carrier (CC) may be referred to as a cell, a frequency carrier and a carrier frequency.

A radio frame may include one or a plurality of durations (frames) in a time domain. Each of one or a plurality of durations (frames) that makes up a radio frame may be referred to as a subframe. Furthermore, the subframe may include one or a plurality of slots in the time domain. The subframe may be a fixed time duration (e.g., 1 ms) that does not depend on the numerologies.

In this regard, the numerology may be a communication parameter to be applied to at least one of transmission and reception of a certain signal or channel. The numerology may indicate at least one of, for example, a SubCarrier Spacing (SCS), a bandwidth, a symbol length, a cyclic prefix length, a Transmission Time Interval (TTI), the number of symbols per TTI, a radio frame configuration, specific filtering processing performed by a transceiver in a frequency domain, and specific windowing processing performed by the transceiver in a time domain.

The slot may include one or a plurality of symbols (Orthogonal Frequency Division Multiplexing (OFDM) symbols or Single Carrier-Frequency Division Multiple Access (SC-FDMA) symbols) in the time domain. Furthermore, the slot may be a time unit based on the numerologies.

The slot may include a plurality of mini slots. Each mini slot may include one or a plurality of symbols in the time domain. Furthermore, the mini slot may be referred to as a subslot. The mini slot may include a smaller number of symbols than that of the slot. The PDSCH (or the PUSCH) to be transmitted in larger time units than that of the mini slot may be referred to as a PDSCH (PUSCH) mapping type A. The PDSCH (or the PUSCH) to be transmitted by using the mini slot may be referred to as a PDSCH (PUSCH) mapping type B.

The radio frame, the subframe, the slot, the mini slot and the symbol each indicate a time unit for conveying signals. The other corresponding names may be used for the radio frame, the subframe, the slot, the mini slot and the symbol.

In addition, time units such as a frame, a subframe, a slot, a mini slot and a symbol in the present disclosure may be interchangeably read.

For example, 1 subframe may be referred to as a TTI, a plurality of contiguous subframes may be referred to as TTIs, or 1 slot or 1 mini slot may be referred to as a TTI. That is, at least one of the subframe and the TTI may be a subframe (1 ms) according to legacy LTE, may be a duration (e.g., 1 to 13 symbols) shorter than 1 ms or may be a duration longer than 1 ms. In addition, a unit that indicates the TTI may be referred to as a slot or a mini slot instead of a subframe.

In this regard, the TTI refers to, for example, a minimum time unit of scheduling of radio communication. For example, in the LTE system, the base station performs scheduling for allocating radio resources (a frequency bandwidth or transmission power that can be used in each user terminal) in TTI units to each user terminal. In this regard, a definition of the TTI is not limited to this.

The TTI may be a transmission time unit of a channel-coded data packet (transport block), code block or codeword, or may be a processing unit of scheduling or link adaptation. In addition, when the TTI is given, a time period (e.g., the number of symbols) in which a transport block, a code block or a codeword is actually mapped may be shorter than the TTI.

In addition, when 1 slot or 1 mini slot is referred to as a TTI, 1 or more TTIs (i.e., 1 or more slots or 1 or more mini slots) may be a minimum time unit of scheduling. Furthermore, the number of slots (the number of mini slots) that make up a minimum time unit of the scheduling may be controlled.

The TTI having the time duration of 1 ms may be referred to as a general TTI (TTIs according to 3GPP Rel. 8 to 12), a normal TTI, a long TTI, a general subframe, a normal subframe, a long subframe or a slot. A TTI shorter than the general TTI may be referred to as a reduced TTI, a short TTI, a partial or fractional TTI, a reduced subframe, a short subframe, a mini slot, a subslot or a slot.

In addition, the long TTI (e.g., the general TTI or the subframe) may be read as a TTI having a time duration exceeding 1 ms, and the short TTI (e.g., the reduced TTI) may be read as a TTI having a TTI length less than the TTI length of the long TTI and equal to or more than 1 ms.

A Resource Block (RB) is a resource allocation unit of the time domain and the frequency domain, and may include one or a plurality of contiguous subcarriers in the frequency domain. The numbers of subcarriers included in RBs may be the same irrespectively of a numerology, and may be, for example, 12. The numbers of subcarriers included in the RBs may be determined based on the numerology.

Furthermore, the RB may include one or a plurality of symbols in the time domain or may have the length of 1 slot, 1 mini slot, 1 subframe or 1 TTI. 1 TTI or 1 subframe may each include one or a plurality of resource blocks.

In this regard, one or a plurality of RBs may be referred to as a Physical Resource Block (Physical RB (PRB)), a Sub-Carrier Group (SCG), a Resource Element Group (REG), a PRB pair or an RB pair.

Furthermore, the resource block may include one or a plurality of Resource Elements (REs). For example, 1 RE may be a radio resource domain of 1 subcarrier and 1 symbol.

A Bandwidth Part (BWP) (that may be referred to as a partial bandwidth) may mean a subset of contiguous common Resource Blocks (common RBs) for a certain numerology in a certain carrier. In this regard, the common RB may be specified by an RB index based on a common reference point of the certain carrier. A PRB may be defined based on a certain BWP, and may be numbered in the certain BWP.

The BWP may include a UL BWP (a BWP for UL) and a DL BWP (a BWP for DL). One or a plurality of BWPs in 1 carrier may be configured to the UE.

At least one of the configured BWPs may be active, and the UE may not assume that given signals/channels are transmitted and received outside the active BWP. In addition, a "cell" and a "carrier" in the present disclosure may be read as a "BWP".

In this regard, structures of the above-described radio frame, subframe, slot, mini slot and symbol are only exemplary structures. For example, configurations such as the number of subframes included in a radio frame, the number of slots per subframe or radio frame, the number of mini slots included in a slot, the numbers of symbols and RBs included in a slot or a mini slot, the number of subcarriers included in an RB, the number of symbols in a TTI, a symbol length and a Cyclic Prefix (CP) length can be variously changed.

Furthermore, the information and the parameters described in the present disclosure may be expressed by using absolute values, may be expressed by using relative values with respect to given values or may be expressed by using other corresponding information. For example, a radio resource may be instructed by a given index.

Names used for parameters in the present disclosure are in no respect restrictive names. Furthermore, numerical expressions that use these parameters may be different from those explicitly disclosed in the present disclosure. Various channels (the PUCCH and the PDCCH) and information elements can be identified based on various suitable names. Therefore, various names assigned to these various channels and information elements are in no respect restrictive names.

The information and the signals described in the present disclosure may be expressed by using one of various different techniques. For example, the data, the instructions, the commands, the information, the signals, the bits, the symbols and the chips mentioned in the above entire description may be expressed as voltages, currents, electromagnetic waves, magnetic fields or magnetic particles, optical fields or photons, or arbitrary combinations of these.

Furthermore, the information and the signals can be output at least one of from a higher layer to a lower layer and from the lower layer to the higher layer. The information and the signals may be input and output via a plurality of network nodes.

The input and output information and signals may be stored in a specific location (e.g., memory) or may be managed by using a management table. The information and signals to be input and output can be overridden, updated or additionally written. The output information and signals may be deleted. The input information and signals may be transmitted to other apparatuses.

Notification of information is not limited to the aspect/embodiment described in the present disclosure and may be performed by using other methods. For example, the information may be notified in the present disclosure by a physical layer signaling (e.g., Downlink Control Information (DCI) and Uplink Control Information (UCI)), a higher layer signaling (e.g., a Radio Resource Control (RRC) signaling, broadcast information (a Master Information Block (MIB) and a System Information Block (SIB)), and a Medium Access Control (MAC) signaling), other signals or combinations of these.

In addition, the physical layer signaling may be referred to as Layer 1/Layer 2 (L1/L2) control information (L1/L2 control signal) or L1 control information (L1 control signal). Furthermore, the RRC signaling may be referred to as an RRC message, and may be, for example, an RRCConnectionSetup message or an RRCConnectionReconfiguration message. Furthermore, the MAC signaling may be notified by using, for example, an MAC Control Element (MAC CE).

Furthermore, notification of given information (e.g., notification of "being X") is not limited to explicit notification, and may be given implicitly (by, for example, not giving notification of the given information or by giving notification of another information).

Decision may be made based on a value (0 or 1) expressed as 1 bit, may be made based on a boolean expressed as true or false or may be made by comparing numerical values (by, for example, making comparison with a given value).

Irrespectively of whether software is referred to as software, firmware, middleware, a microcode or a hardware description language or is referred to as other names, the software should be widely interpreted to mean a command, a command set, a code, a code segment, a program code, a program, a subprogram, a software module, an application, a software application, a software package, a routine, a subroutine, an object, an executable file, an execution thread, a procedure or a function.

Furthermore, software, commands and information may be transmitted and received via transmission media. When, for example, the software is transmitted from websites, servers or other remote sources by using at least ones of wired techniques (e.g., coaxial cables, optical fiber cables, twisted pairs and Digital Subscriber Lines (DSLs)) and radio techniques (e.g., infrared rays and microwaves), at least ones of these wired techniques and radio techniques are included in a definition of the transmission media.

The terms "system" and "network" used in the present disclosure can be interchangeably used. The "network" may mean an apparatus (e.g., base station) included in the network.

In the present disclosure, terms such as "precoding", a "precoder", a "weight (precoding weight)", "Quasi-Co-Location (QCL)", a "Transmission Configuration Indication state (TCI State)", a "spatial relation", a "spatial domain filter", "transmission power", "phase rotation", an "antenna port", an "antenna port group", a "layer", "the number of layers", a "rank", a "resource", a "resource set", a "resource group", a "beam", a "beam width", a "beam angle", an "antenna", an "antenna element" and a "panel" can be interchangeably used.

In the present disclosure, terms such as a "base Station (BS)", a "radio base station", a "fixed station", a "NodeB", an "eNodeB (eNB)", a "gNodeB (gNB)", an "access point", a "Transmission Point (TP)", a "Reception Point (RP)", a "Transmission/Reception Point (TRP)", a "panel", a "cell", a "sector", a "cell group", a "carrier" and a "component carrier" can be interchangeably used. The base station is also referred to as terms such as a macro cell, a small cell, a femtocell or a picocell.

The base station can accommodate one or a plurality of (e.g., three) cells. When the base station accommodates a plurality of cells, an entire coverage area of the base station can be partitioned into a plurality of smaller areas. Each smaller area can also provide a communication service via a base station subsystem (e.g., indoor small base station (RRH: Remote Radio Head)). The term "cell" or "sector" indicates part or the entirety of the coverage area of at least one of the base station and the base station subsystem that provide a communication service in this coverage.

In the present disclosure, the terms such as "Mobile Station (MS)", "user terminal", "user apparatus (UE: User Equipment)" and "terminal" can be interchangeably used.

The mobile station is also referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client or some other appropriate terms in some cases.

At least one of the base station and the mobile station may be referred to as a transmission apparatus, a reception apparatus or a radio communication apparatus. In addition, at least one of the base station and the mobile station may be a device mounted on a movable body or the movable body itself. The movable body may be a vehicle (e.g., a car or an airplane), may be a movable body (e.g., a drone or a self-driving car) that moves unmanned or may be a robot (a manned type or an unmanned type). In addition, at least one of the base station and the mobile station includes an apparatus, too, that does not necessarily move during a communication operation. For example, at least one of the base station and the mobile station may be an Internet of Things (IoT) device such as a sensor.

Furthermore, the base station in the present disclosure may be read as the user terminal. For example, each aspect/embodiment of the present disclosure may be applied to a configuration where communication between the base station and the user terminal is replaced with communication between a plurality of user terminals (that may be referred to as, for example, Device-to-Device (D2D) or Vehicle-to-Everything (V2X)). In this case, the user terminal 20 may be configured to include the functions of the above-described base station 10. Furthermore, words such as "uplink" and "downlink" may be read as a word (e.g., a "side") that matches terminal-to-terminal communication. For example, the uplink channel and the downlink channel may be read as side channels.

Similarly, the user terminal in the present disclosure may be read as the base station. In this case, the base station 10 may be configured to include the functions of the above-described user terminal 20.

In the present disclosure, operations performed by the base station are performed by an upper node of this base station depending on cases. Obviously, in a network including one or a plurality of network nodes including the base stations, various operations performed to communicate with a terminal can be performed by base stations, one or more network nodes (that are regarded as, for example, Mobility Management Entities (MMES) or Serving-Gateways (S-GWs), yet are not limited to these) other than the base stations or a combination of these.

Each aspect/embodiment described in the present disclosure may be used alone, may be used in combination or may be switched and used when carried out. Furthermore, orders of the processing procedures, the sequences and the flowchart according to each aspect/embodiment described in the present disclosure may be rearranged unless contradictions arise. For example, the method described in the present disclosure presents various step elements by using an exemplary order and is not limited to the presented specific order.

Each aspect/embodiment described in the present disclosure may be applied to Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), Future Radio Access (FRA), the New-Radio Access Technology (RAT), New Radio (NR), New radio access (NX), Future generation radio access (FX), Global System for Mobile communications (GSM) (registered trademark), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other appropriate radio communication methods, or next-generation systems that are expanded based on these systems. Furthermore, a plurality of systems may be combined (e.g., a combination of LTE or LTE-A and 5G) and applied.

The phrase "based on" used in the present disclosure does not mean "based only on" unless specified otherwise. In other words, the phrase "based on" means both of "based only on" and "based at least on".

Every reference to elements that use names such as "first" and "second" used in the present disclosure does not generally limit the quantity or the order of these elements. These names can be used in the present disclosure as a convenient method for distinguishing between two or more elements. Hence, the reference to the first and second elements does not mean that only two elements can be employed or the first element should precede the second element in some way.

The term "deciding (determining)" used in the present disclosure includes diverse operations in some cases. For example, "deciding (determining)" may be considered to "decide (determine)" judging, calculating, computing, processing, deriving, investigating, looking up, search and inquiry (e.g., looking up in a table, a database or another data structure), and ascertaining.

Furthermore, "deciding (determining)" may be considered to "decide (determine)" receiving (e.g., receiving information), transmitting (e.g., transmitting information), input, output and accessing (e.g., accessing data in a memory).

Furthermore, "deciding (determining)" may be considered to "decide (determine)" resolving, selecting, choosing, establishing and comparing. That is, "deciding (determining)" may be considered to "decide (determine)" some operation.

Furthermore, "deciding (determining)" may be read as "assuming", "expecting" and "considering".

The words "connected" and "coupled" used in the present disclosure or every modification of these words can mean every direct or indirect connection or coupling between 2 or more elements, and can include that 1 or more intermediate elements exist between the two elements "connected" or "coupled" with each other. The elements may be coupled or connected physically or logically or by a combination of these physical and logical connections. For example, "connection" may be read as "access".

It can be understood in the present disclosure that, when connected, the two elements are "connected" or "coupled" with each other by using 1 or more electric wires, cables or printed electrical connection, and by using electromagnetic energy having wavelengths in radio frequency domains, microwave domains or (both of visible and invisible) light domains in some non-restrictive and non-comprehensive examples.

A sentence that "A and B are different" in the present disclosure may mean that "A and B are different from each other". In this regard, the sentence may mean that "A and B are each different from C". Words such as "separate" and "coupled" may be also interpreted in a similar way to "different".

When the words "include" and "including" and modifications of these words are used in the present disclosure, these words intend to be comprehensive similar to the word "comprising". Furthermore, the word "or" used in the present disclosure intends not to be an exclusive OR.

When, for example, translation adds articles such as a, an and the in English in the present disclosure, the present disclosure may include that nouns coming after these articles are plural.

The invention according to the present disclosure has been described in detail above. However, it is obvious for a person skilled in the art that the invention according to the present disclosure is not limited to the embodiment described in the present disclosure. The invention according to the present disclosure can be carried out as modified and changed aspects without departing from the gist and the scope of the invention defined based on the recitation of the claims. Accordingly, the description of the present disclosure is intended for exemplary explanation, and does not bring any restrictive meaning to the invention according to the present disclosure.

The invention claimed is:

1. A terminal comprising:
a transmitter that reports capability information indicating that a half-duplex operation is applied among multiple cells;
a receiver that receives information regarding a slot format of a first cell; and
a processor that, when the half-duplex operation is applied, expects, in a symbol where transmission or reception on the first cell is indicated by the information regarding the slot format, that transmission or reception in a direction that is different from the first cell is not indicated to a second cell, or controls, in the symbol, not to perform transmission or reception on the first cell,
wherein when transmission or reception in the symbol is configured by higher layer signaling for the first cell and transmission or reception in a direction that is different from the first cell is indicated, by downlink control information, to the second cell in the symbol, the processor controls not to perform transmission or reception on the first cell.

2. The terminal according to claim 1, wherein the first cell is defined as a reference cell with a smallest index.

3. The terminal according to claim 1, wherein when transmission or reception in the symbol is configured by higher layer signaling for the first cell, the processor expects that transmission or reception in a direction that is different from the first cell is not indicated, by downlink control information, to the second cell in the symbol.

4. The terminal according to claim 1, wherein when transmission or reception in the symbol is configured by first downlink control information for the first cell, the processor expects that transmission or reception in a direction that is different from the first cell is not indicated, by second downlink control information, to the second cell in the symbol.

5. A radio communication method for a terminal, comprising:
reporting capability information indicating that a half-duplex operation is applied among multiple cells;
receiving information regarding a slot format of a first cell;

when the half-duplex operation is applied, expecting, in a symbol where transmission or reception on the first cell is indicated by the information regarding the slot format, that transmission or reception in a direction that is different from the first cell is not indicated to a second cell, or controlling, in the symbol, not to perform transmission or reception on the first cell; and when transmission or reception in the symbol is configured by higher layer signaling for the first cell and transmission or reception in a direction that is different from the first cell is indicated, by downlink control information, to the second cell in the symbol, controlling not to perform transmission or reception on the first cell.

6. A system comprising a terminal and a base station, wherein the terminal comprises:
- a transmitter that reports capability information indicating that a half-duplex operation is applied among multiple cells;
- a receiver that receives information regarding a slot format of a first cell; and
- a processor that, when the half-duplex operation is applied, expects, in a symbol where transmission or reception on the first cell is indicated by the information regarding the slot format, that transmission or reception in a direction that is different from the first cell is not indicated to a second cell, or controls, in the symbol, not to perform transmission or reception on the first cell, wherein when transmission or reception in the symbol is configured by higher layer signaling for the first cell and transmission or reception in a direction that is different from the first cell is indicated, by downlink control information, to the second cell in the symbol, the processor controls not to perform transmission or reception on the first cell, and the base station comprises:
- a receiver that receives the capability information; and
- a transmitter that transmits the information regarding the slot format.

* * * * *